(12) United States Patent
Huh et al.

(10) Patent No.: US 11,716,129 B2
(45) Date of Patent: Aug. 1, 2023

(54) METHOD AND DEVICE FOR PROVIDING DIFFERENTIATED SERVICE FOR EACH REGION ON BASIS OF BEAM BOOK INFORMATION

(71) Applicant: Samsung Electronics Co., Ltd., Suwon-si (KR)

(72) Inventors: Jaeyoung Huh, Suwon-si (KR); Sunmin Park, Suwon-si (KR); Sangwon Chae, Suwon-si (KR); Mooyoung Kim, Suwon-si (KR); Minjung Kim, Suwon-si (KR); Jungeun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/528,766

(22) Filed: Nov. 17, 2021

(65) Prior Publication Data
US 2022/0077908 A1    Mar. 10, 2022

Related U.S. Application Data

(63) Continuation of application No. PCT/KR2020/001797, filed on Feb. 7, 2020.

(30) Foreign Application Priority Data

May 20, 2019   (KR) .................... 10-2019-0059039

(51) Int. Cl.
*H04B 7/06*     (2006.01)
*H04W 16/28*    (2009.01)
(Continued)

(52) U.S. Cl.
CPC .......... *H04B 7/0617* (2013.01); *H04B 7/0639* (2013.01); *H04W 16/28* (2013.01); *H04W 72/046* (2013.01); *H04W 88/08* (2013.01)

(58) Field of Classification Search
CPC ... H04B 7/0617; H04B 7/0639; H04W 16/28; H04W 72/046; H04W 88/08
See application file for complete search history.

(56) References Cited

U.S. PATENT DOCUMENTS 8,934,903 B2    1/2015  Kwun et al.
2009/0270101 A1  10/2009 Seki
(Continued)

FOREIGN PATENT DOCUMENTS

KR    10-1122395 B1    3/2012
WO    2018/009577 A1   1/2018

OTHER PUBLICATIONS

European Search Report dated Jun. 1, 2022, issued in European Application No. 20808837.7.

*Primary Examiner* — Jaison Joseph
(74) *Attorney, Agent, or Firm* — Jefferson IP Law, LLP

(57) ABSTRACT

A method and a device are provided. The device includes an antenna module, an interface for delivery to a protocol for transmission, a memory, and a processor, wherein the processor is set to determine antenna information for each beam index based on a transmission beam that can be generated in the antenna module, generate beam book information based on the determined antenna information, and transmit the beam book information and device connection information, related to an electronic device present inside the coverage of a base station, to an external server through the interface.

11 Claims, 16 Drawing Sheets

(51) Int. Cl.
*H04W 72/044* (2023.01)
*H04W 88/08* (2009.01)

(56) References Cited

U.S. PATENT DOCUMENTS

| | | |
|---|---|---|
| 2015/0365141 A1 | 12/2015 | Derneryd et al. |
| 2017/0318491 A1 | 11/2017 | Chen et al. |
| 2018/0070211 A1 | 3/2018 | Annamalai |
| 2018/0115958 A1* | 4/2018 | Raghavan ............ H04B 7/0697 |
| 2019/0097712 A1 | 3/2019 | Singh et al. |
| 2022/0077908 A1* | 3/2022 | Huh ................... H04W 72/046 |

* cited by examiner

FIG. 3A
FIG. 3B
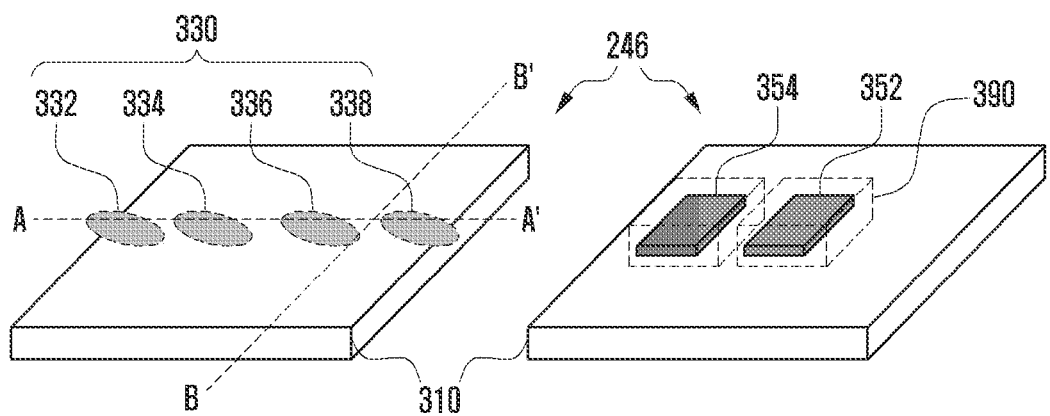
FIG. 3C
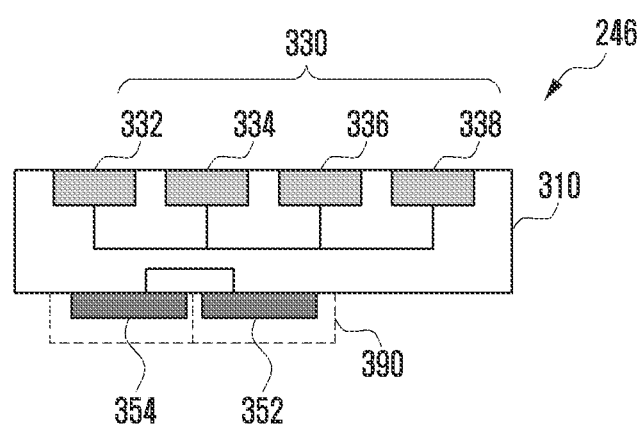

FIG. 9B

| | | | | | | | |
|---|---|---|---|---|---|---|---|
| 951 → #1 | #n+1 | | | ... | | | |
| 952 → #2 | #n+1 | | | ... | | | |
| | | | | | | | |
| ⋮ | ⋮ | | | | | | |
| | | | | | | | |
| 95n → #7 | #n+m | | | | | | |

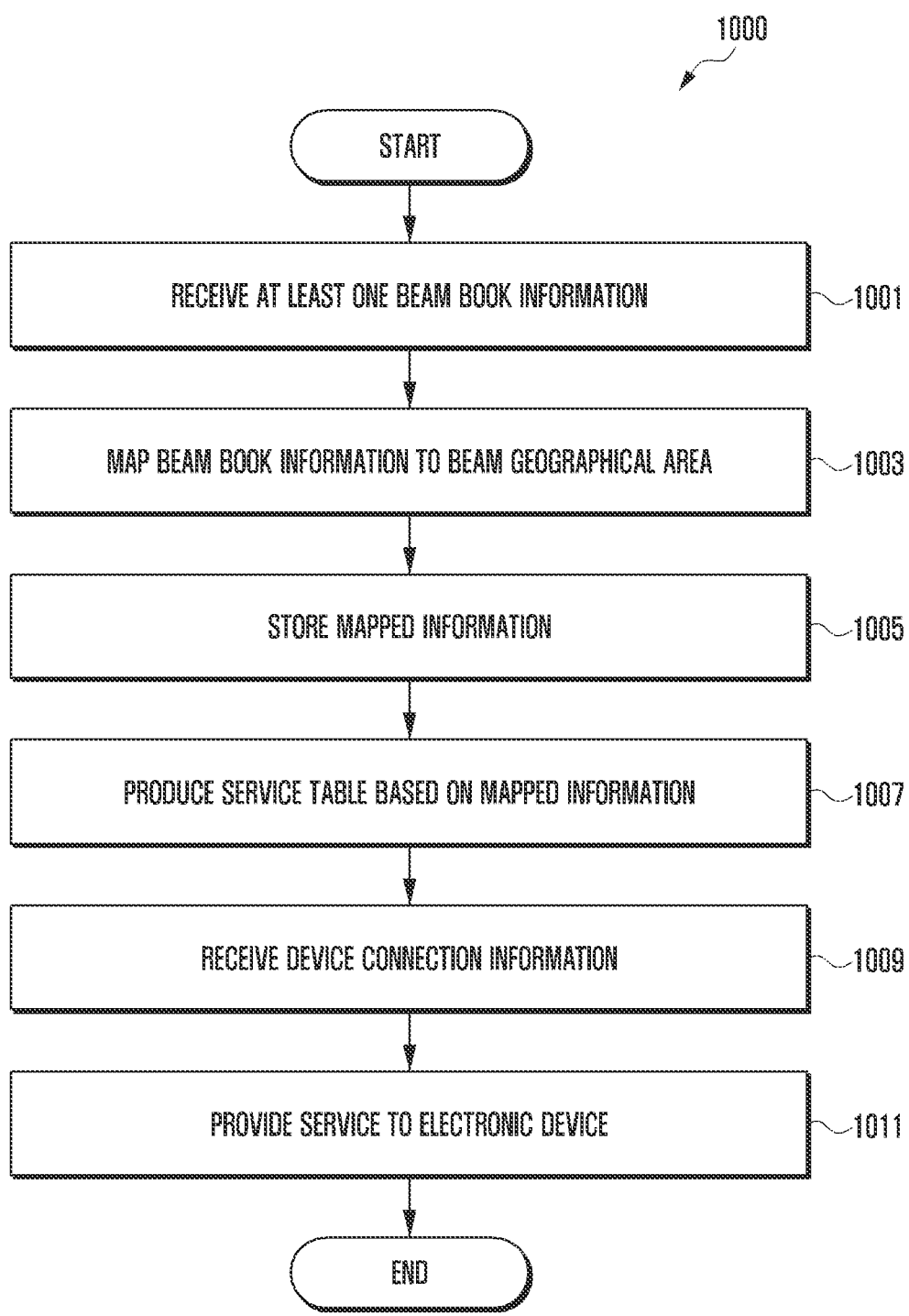

METHOD AND DEVICE FOR PROVIDING DIFFERENTIATED SERVICE FOR EACH REGION ON BASIS OF BEAM BOOK INFORMATION

CROSS-REFERENCE TO RELATED APPLICATION(S)

This application is a continuation application, claiming priority under § 365(c), of an International application No. PCT/KR2020/001797, filed on Feb. 7, 2020, which is based on and claims the benefit of a Korean patent application number 10-2019-0059039, filed on May 20, 2019, in the Korean Intellectual Property Office, the disclosure of which is incorporated by reference herein in its entirety.

BACKGROUND

1. Field

The disclosure relates to a method and an apparatus for providing a differentiated service for each area based on beam book information.

2. Description of Related Art

A $5^{th}$ generation (5G) communication system may provide a flexible system structure and functions which enable various services having different requirements to operate in a single system. The 5G communication system may use a mmWave frequency (e.g., 28 to 86 gigahertz (GHz)) band in order to secure a wide bandwidth. In the 5G communication system, path loss may remarkably occur in a shadow area due to the characteristic of the frequency. The intensity of a signal is proportional to the square of a wavelength, and when the wavelength of a signal becomes shorter, the signal has a lower diffraction and has difficulty in penetrating an obstacle. A signal may need to be stably transmitted to all electronic devices located in the coverage area of a base station while communication is performed, and thus, a beamforming technology may be used for overcoming high signal attenuation occurring in the electronic device.

Various beams may be made by changing the phase of an antenna array, and beamforming may be used for transmission or reception by an electronic device, in addition to transmission or reception by a base station in new radio (NR). A range may be enlarged by using a narrow beam width for efficient transmission of a high frequency wave. Since the beam width is narrow, an optimal transmission or reception beam pair needs to be obtained by adjusting the transmission beam of a base station side and the reception beam of an electronic device side, for efficient communication.

The electronic device may provide a location based service (LBS) that provides an appropriate service based on the location of a user. For example, the location-based service may include a navigation service that provides guidance associated with a path from the current location to a destination, a service that recommends a gas station or store existing around the current location of a user according to needs of the user, or a geofence service which reports whether a user enters or leaves a predetermined region.

In order to provide a location-based service, it is important to recognize the location of a user quickly and accurately. However, a global positioning system (GPS) service that measures a location based on a signal received from an artificial satellite is incapable of being used in an indoor environment, and consumes a large amount of power which is a drawback. Alternatively, a wireless local area network (WLAN) signal-based service may be capable of being used in an indoor environment unlike a GPS service, and may reduce the amount of power consumed when compared to the amount of power consumed by the GPS service. In the case of the WLAN signal-based service, an electronic device may receive an ambient WLAN signal via a WLAN scanning operation, may obtain information associated with an adjacent WLAN access point (AP), and may compare the information with WLAN information obtained (or collected) in advance, thereby estimating a location. If the electronic device frequently performs WLAN scanning, the accuracy and the speed of the location may be increased but the amount of power consumed may be increased.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for producing beam book information based on antenna information for each beam index, matching the produced beam book information to an area, and providing a differentiated service for each area based on the matched information.

Additional aspects will be set forth in part in the description which follows and, in part, will be apparent from the description, or may be learned by practice of the presented embodiments.

In accordance with an aspect of the disclosure, a base station is provided. The base station includes an antenna module, an interface configured to perform delivery to a protocol for transmission, a memory, and a processor, and the processor is configured to determine antenna information for each beam index based on a transmission beam producible by the antenna module, to produce beam book information based on the determined antenna information, and to transmit device connection information related to an electronic device existing in a coverage area of the base station and the beam book information to an external server via the interface.

In accordance with another aspect of the disclosure, a server is provided. The server includes a memory and a processor, and the processor is configured to receive at least one piece of beam book information from at least one base station, to produce a service table based on the beam book information, and to provide an area-based service to an electronic device based on the service table.

In accordance with another aspect of the disclosure, an electronic device is provided. The electronic device includes a communication module, a display, a memory, and a processor, and the processor is configured to receive service information from an external server via the communication module, to display the service information on a map image via the display, and to provide a service provided from the external server to a user.

According to various embodiments of the disclosure, beam book information can be produced based on antenna information for each beam index, the produced beam book information can be matched to an area, and a differentiated service for each area can be provided based on the matched information.

According to various embodiments of the disclosure, a mobile edge computing (MEC) server adjacent to a base station can provide a differentiated service for each area to an electronic device based on beam book information received from the base station, the number of electronic devices in a beam area, or the order of entry of electronic devices.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 3A, 3B, and 3C are diagrams illustrating an embodiment of a structure of a third antenna module according to an embodiment of the disclosure;

FIGS. 9A and 9B are diagrams illustrating producing beam book information by a base station according to various embodiments of the disclosure;

FIG. 10 is a flowchart illustrating a method of operating an MEC server according to an embodiment of the disclosure;

Throughout the drawings, it should be noted that like reference numbers are used to depict the same or similar elements, features, and structures.

DETAILED DESCRIPTION

Figure 1:
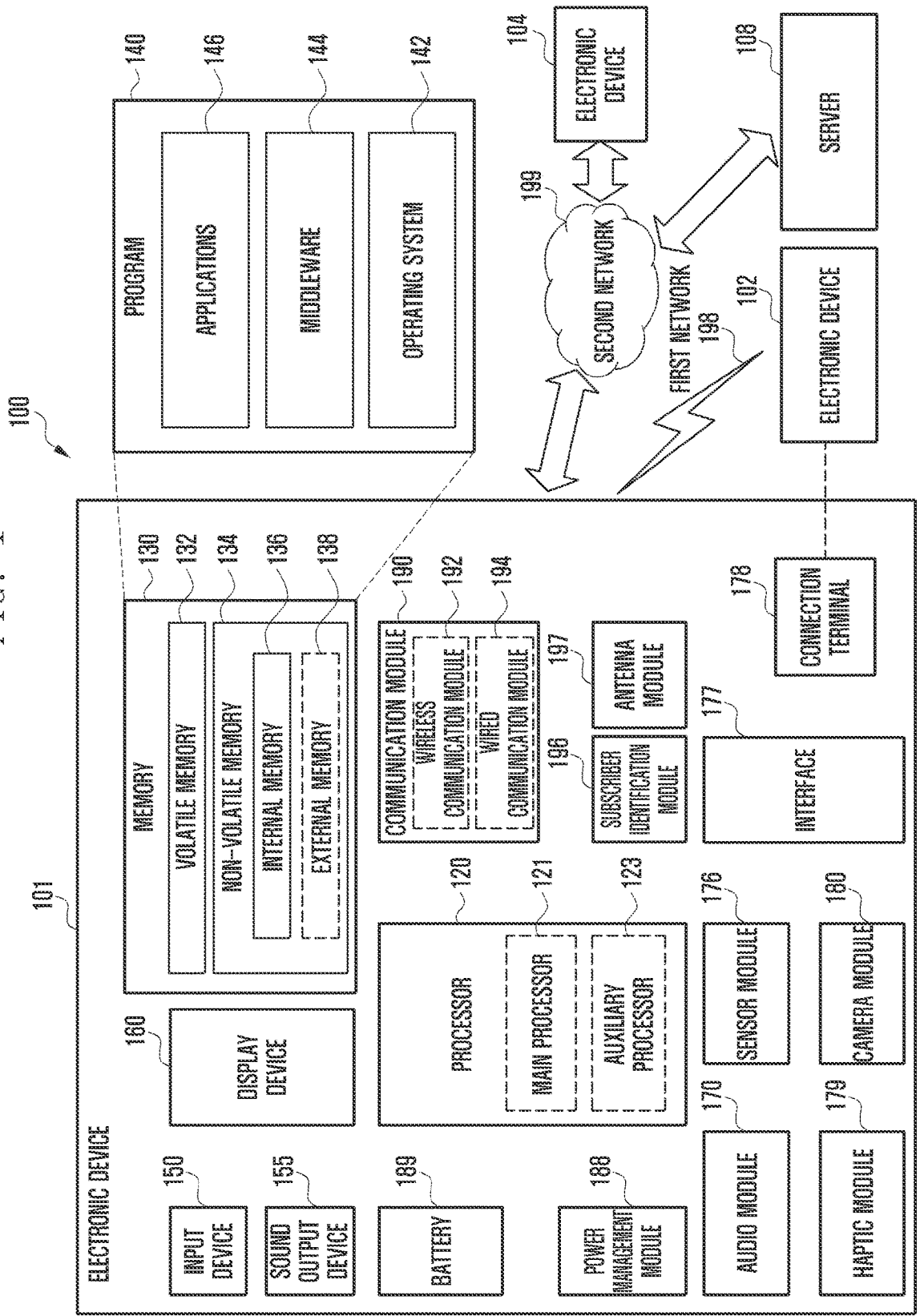
FIG. 1 is a block diagram of electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments may be one of various types of electronic devices. The electronic devices may include, for example, and without limitation, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combinations thereof and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment of the disclosure, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement)

or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an example embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
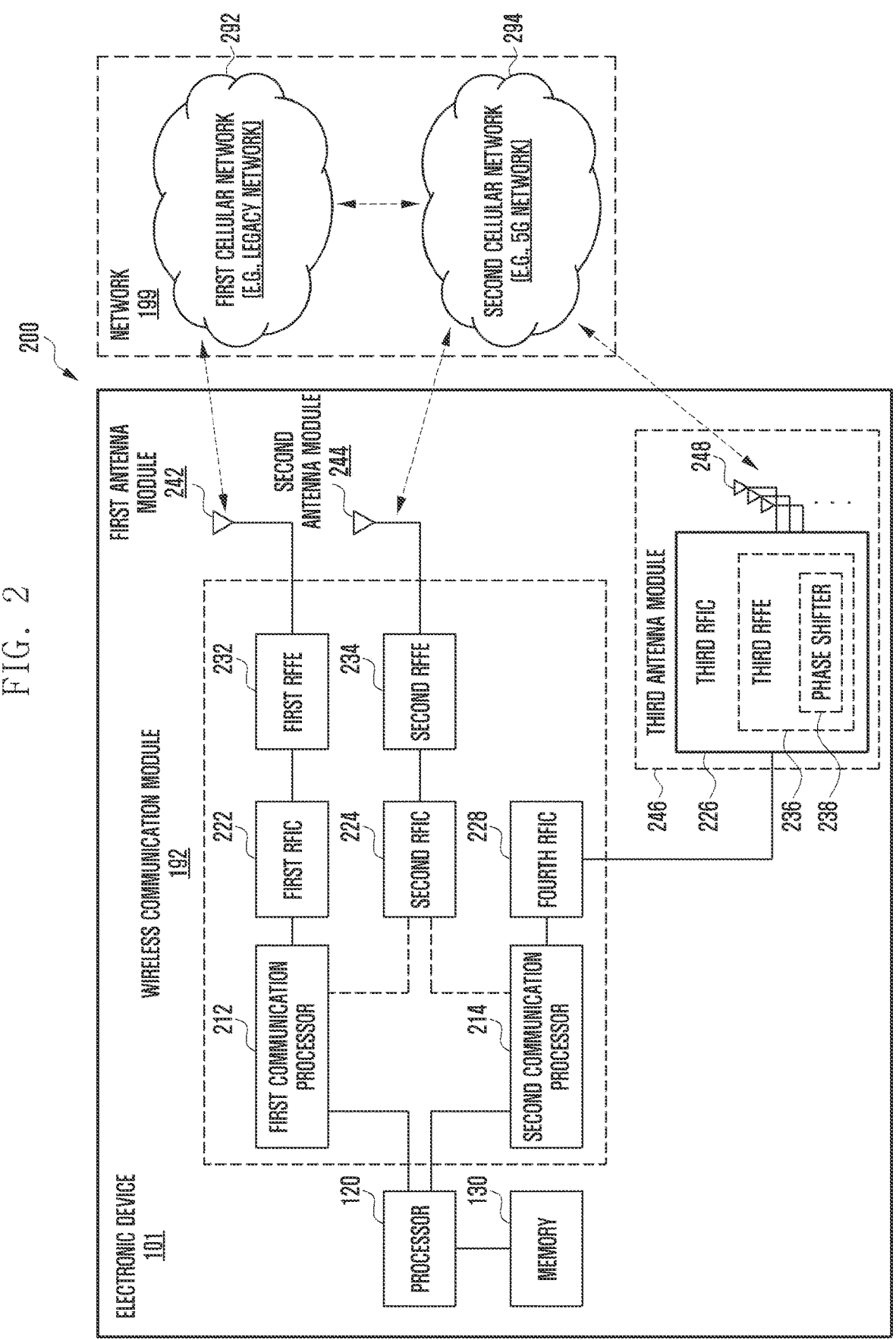
FIG. 2 is a block diagram of an electronic device for supporting legacy network communication and 5th generation (5G) network communication according to an embodiment of the disclosure.

FIG. 2 is a block diagram 200 illustrating an electronic device 101 for supporting legacy network communication and 5G network communication according to an embodiment of the disclosure.

Referring to FIG. 2, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module (e.g., including at least one antenna) 242, a second antenna module (e.g., including at least one antenna) 244, and an antenna 248. The electronic device 101 may further include a processor (e.g., including processing circuitry) 120 and a memory 130.

The second network 199 may include a first network (e.g., a legacy network) 292 and a second network (e.g., a 5G network) 294. According to another embodiment of the disclosure, the electronic device 101 may further include at least one component among the components illustrated in FIG. 1, and the second network 199 may further include at least one different network. According to an embodiment of the disclosure, the first communication processor 212, the second communication processor 214, the first RFIC 222, the second RFIC 224, the fourth RFIC 228, the first RFFE 232, and the second RFFE 234 may form at least a part of the wireless communication module 192. According to another embodiment of the disclosure, the fourth RFIC 228 may be omitted or included as a part of the third RFIC 226.

The first communication processor 212 may include various communication processing circuitry and support establishment of a communication channel in a band to be used for wireless communication with the first network 292, and legacy network communication through the established communication channel. According to various embodiments of the disclosure, the first network may be a legacy network including, for example, and without limitation, a second generation (2G), third generation (3G), fourth generation (4G), or long term evolution (LTE) network. The second communication processor 214 may support establishment of a communication channel corresponding to a designated band (for example, about 6 GHz to about 60 GHz) among bands to be used for wireless communication with the second network 294, and, for example, and without limitation, 5G network communication through the established communication channel. According to various embodiments of the disclosure, the second network 294 may, for example, be a 5G network as referenced by third generation partnership project (3GPP). Additionally, according to an embodiment of the disclosure, the first communication processor 212 or the second communication processor 214 may support establishment of a communication channel corresponding to another designated band (for example, about 6 GHz or lower) among the bands to be used for wireless communication with the second network 294, and, for example, 5G network communication through the established communication channel. According to an embodiment of the disclosure, the first communication processor 212 and the second communication processor 214 may be implemented inside a single chip or a single package. According to various embodiments of the disclosure, the first communication processor 212 or the second communication processor 214 may, for example, be provided inside a single chip or a single package together with a processor 120, an auxiliary processor 123, or a communication module 190.

The first RFIC 222 may convert a baseband signal generated by the first communication processor 212 into a radio frequency (RF) signal at about 700 MHz to about 3 GHz, which may be used for the first network 292 (for example, legacy network), during transmission. During reception, an RF signal may be acquired from the first network 292 (for example, legacy network) through an antenna (for example, the first antenna module 242), and may be preprocessed through an RFFE (for example, the first RFFE 232). The first RFIC 222 may convert the preprocessed RF signal into a baseband signal such that the same can be processed by the first communication processor 212.

The second RFIC 224 may convert a baseband signal generated by the first communication processor 212 or the second communication processor 214 into an RF signal in a Sub6 band (for example, about 6 GHz or lower) (hereinafter, referred to as a 5G Sub6 RF signal) that may be used for the second network 294 (for example, 5G network). During reception, a 5G Sub6 RF signal may be acquired from the second network 294 (for example, 5G network) through an antenna (for example, the second antenna module 244), and may be preprocessed through an RFFE (for example, the second RFFE 234). The second RFIC 224 may convert the preprocessed 5G Sub6 RF signal into a baseband signal such that the same can be processed by a communication processor corresponding to the first communication processor 212 or the second communication processor 214.

The third RFIC 226 may convert a baseband signal generated by the second communication processor 214 into an RF signal in a 5G Above6 band (for example, about 6 GHz to about 60 GHz) (hereinafter, referred to as a 5G Above6 signal) that is to be used for the second network 294 (for example, 5G network). During reception, a 5G Above6 RF signal may be acquired from the second network 294 (for example, 5G network) through an antenna (for example, the antenna 248), and may be preprocessed through the third RFFE 236. The third RFIC 226 may convert the preprocessed 5G Above6 signal into a baseband signal such that the same can be processed by the second communication processor 214. According to an embodiment of the disclosure, the third RFFE 236 may be formed as a part of the third RFIC 226.

According to an embodiment of the disclosure, the electronic device 101 may include a fourth RFIC 228 separately from the third RFIC 226 or as at least a part thereof. In this example, the fourth RFIC 228 may convert a baseband signal generated by the second communication processor 214 into an RF signal in an intermediate frequency band (for example, about 9 GHz to about 11 GHz) (hereinafter, referred to as an intermediate frequency (IF) signal) and then deliver the IF signal to the third RFIC 226. The third RFIC 226 may convert the IF signal into a 5G Above6 RF signal. During reception, a 5G Above6 RF signal may be received from the second network 294 (for example, 5G network) through an antenna (for example, antenna 248) and converted into an IF signal by the third RFIC 226. The fourth RFIC 228 may convert the IF signal into a baseband signal such that the same can be processed by the second communication processor 214.

According to an embodiment of the disclosure, the first RIFC 222 and the second RFIC 224 may, for example, be implemented as at least a part of a single chip or a single package. According to an embodiment of the disclosure, the first RFFE 232 and the second RFFE 234 may, for example, be implemented as at least a part of a single chip or a single package. According to an embodiment of the disclosure, at least one antenna module of the first antenna module 242 or the second antenna module 244 may be omitted or coupled to another antenna module so as to process RF signal in multiple corresponding bands.

According to an embodiment of the disclosure, the third RFIC 226 and the antenna 248 may be arranged on the same substrate so as to form a third antenna module 246. For example, the wireless communication module 192 or the processor 120 may be arranged on a first substrate (for example, main printed circuit board (PCB)). In this example, the third RFIC 226 may be formed on a partial area (for example, lower surface) of a second substrate (for example, sub PCB) that is separate from the first substrate, and the antenna 248 may be arranged in another partial area (for example, upper surface), thereby forming a third antenna module 246. The third RFIC 226 and the antenna 248 may be arranged on the same substrate such that the length of the transmission line between the same can be reduced. This may reduce loss (for example, attenuation) of a signal in a high-frequency band (for example, about 6 GHz to about 60 GHz) used for 5G network communication, for example, due to the transmission line. Accordingly, the electronic device 101 may improve the quality or speed of communication with the second network 294 (for example, 5G network).

According to an embodiment of the disclosure, the antenna 248 may, for example, include an antenna array including multiple antenna elements that may be used for beamforming. In this example, the third RFIC 226 may include multiple phase shifters 238 corresponding to the multiple antenna elements, as a part of the third RFFE 236, for example. During transmission, each of the multiple phase shifters 238 may shift the phase of a 5G Above6 RF signal, which is to be transmitted to the outside (for example, base station of 5G network) of the electronic device 101, through a corresponding antenna element. During reception, each of the multiple phase shifters 238 may shift the phase of a 5G Above6 RF signal received from the outside into the same or substantially same phase through a corresponding antenna element. This enables transmission or reception through beamforming between the electronic device 101 and the outside.

The second network 294 (for example, 5G network) may be operated independently of the first network 292 (for example, legacy network) (for example, standalone (SA)), or operated while being connected thereto (for example, non-standalone (NSA)). For example, the 5G network may include an access network (for example, 5G radio access network (RAN) or next-generation network (NG RAN)) and may not include a core network (for example, next-generation core (NGC)). In this example, the electronic device 101 may access the access network of the 5G network and then access an external network (for example, Internet) under the control of the core network (for example, evolved packed core (EPC)) of the legacy network. Protocol information (for example, LTE protocol network) for communication with the legacy network or protocol information (for example, new radio (NR) protocol information) for communication with the 5G network may be stored in the memory 230, and may be accessed by another component (for example, the processor 120, the first communication processor 212, or the second communication processor 214).

FIGS. 3A, 3B, and 3C illustrates an embodiment of a structure of a third antenna module 246 of FIG. 2 according to an embodiment of the disclosure. For reference, FIG. 3A is a perspective view of the third antenna module 246 viewed from one side, FIG. 3B is a perspective view of the third antenna module 246 viewed from another side, and FIG. 3C is a cross-sectional view of the third antenna module 246, taken along line A-A'.

Referring to FIGS. 3A, 3B, and 3C, in an embodiment of the disclosure, the third antenna module 246 may include a printed circuit board 310, an antenna array 330, a radio frequency integrated circuit 352 (RFIC), a power management integrated circuit (PMIC) 354, and a module interface 370. Optionally, the third antenna module 246 may further include a shield member 390. In other embodiments of the disclosure, at least one of the above-mentioned components may be omitted or at least two of the components may be integrally formed.

The printed circuit board 310 may include a plurality of conductive layers and a plurality of nonconductive layers alternately laminated on the conductive layers. The printed circuit board 310 may provide electrical connections between various electronic components disposed in the printed circuit board 310 and/or on the outside by using wiring lines and conductive vias disposed on the conductive layers.

The antenna array 330 (e.g., 248 of FIG. 2) may include a plurality of antenna elements 332, 334, 336, or 338 disposed to form a directional beam. The antenna elements, as illustrated, may be disposed on a first surface of the printed circuit board 310. According to another embodiment of the disclosure, the antenna array 330 may be disposed in the interior of the printed circuit board 310. According to various embodiments of the disclosure, the antenna array 330 may include a plurality of antenna arrays (e.g., dipole antenna arrays and/or patch antenna arrays) of the same or different shapes or kinds.

The RFIC 352 (e.g., 226 of FIG. 2) may be disposed on another area (e.g., a second surface that is opposite to the first surface) of the printed circuit board 310, which is spaced apart from the antenna array. The RFIC 352 may be configured to process a signal of a selected frequency band, which is transmitted and received through the antenna array 330. According to an embodiment of the disclosure, the RFIC 352 may convert a baseband signal acquired from a communication processor (not illustrated) to an RF signal of a specific band when the baseband signal is transmitted. The RFIC 352 may convert the RF signal received through the antenna array 352 to a baseband signal and deliver the baseband signal to the communication processor when the RF signal is received.

According to another embodiment of the disclosure, the RFIC 352 may up-convert an IF signal (e.g., about 9 GHz to about 11 GHz) acquired from an intermediate frequency integrated circuit (IFIC) (e.g., 228 of FIG. 2) to an RF signal of a selected band when the IF signal is transmitted. The RFIC 352 may down-convert the RF signal acquired through the antenna array 352 to an IF signal and deliver the IF signal to the IFIC when the RF signal is received.

The PMIC 354 may be disposed in another partial area (e.g., the second surface) of the printed circuit board 310, which is spaced apart from the antenna array. The PMIC may receive a voltage from the main PCB (not illustrated), and may provide electric power that is necessary for various components (e.g., the RFIC 352) on the antenna module.

The shield member 390 may be disposed at a portion (e.g., the second surface) of the printed circuit board 310 to electromagnetically shield at least one of the RFIC 352 or the PMIC 354. According to an embodiment of the disclosure, the shield member 390 may include a shield can.

Although not illustrated, in various embodiments of the disclosure, the third antenna module 246 may be electrically connected to another printed circuit board (e.g., the main circuit board) through a module interface. The module interface may include a connection member, for example, a coaxial cable connector, a board-to-board connector, an interposer, or a flexible printed circuit board (FPCB). Through the connection member, the RFIC 352 and/or the PMIC 354 of the antenna module may be electrically connected to the printed circuit board.

Figure 4:
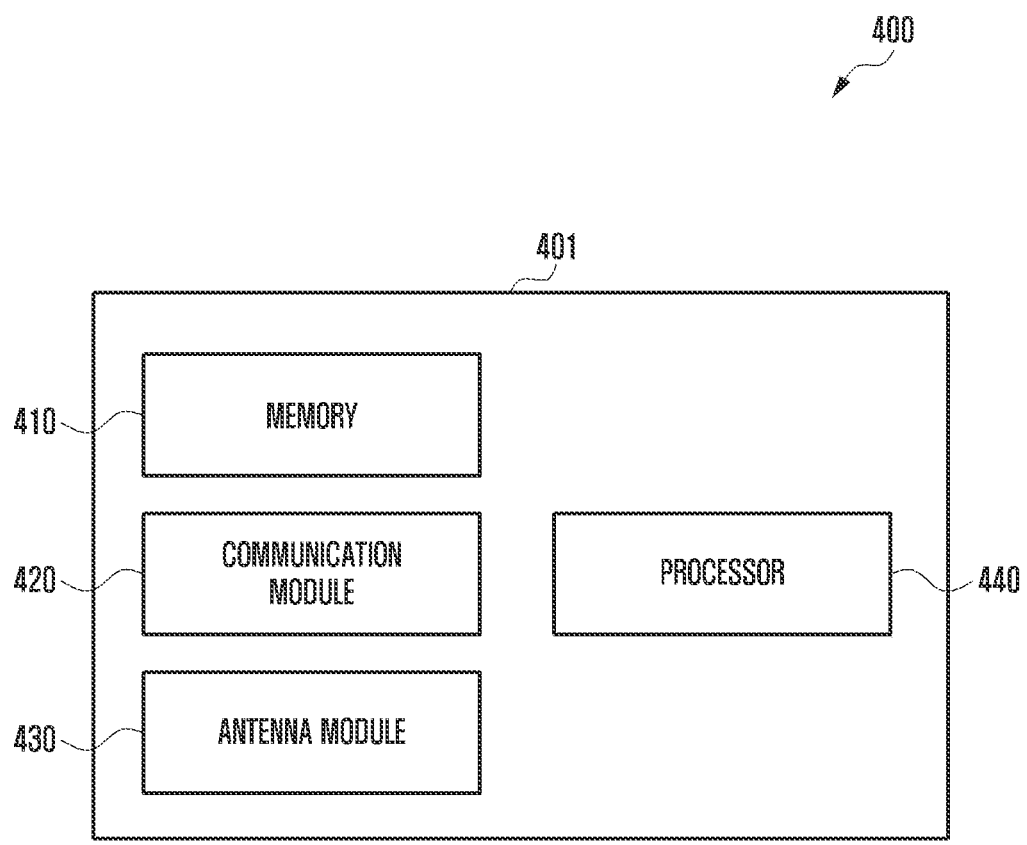
FIG. 4 is a block diagram illustrating a configuration of a base station according to an embodiment of the disclosure.

FIG. 4 is a block diagram 400 illustrating a configuration of a base station according to an embodiment of the disclosure.

Referring to FIG. 4, a base station 401 may include a memory 410, a communication module 420, an antenna module 430, and a processor 440. The base station 401 may be a 5G radio access network (RAN) or a next generation node B (gNB). The base station 401 may provide radio access communication to an electronic device (e.g., the electronic device 101, the electronic device 102, the electronic device 104 of FIG. 1).

The memory 410 may store various data used by at least one element (e.g., the processor 440, the communication module 420, the antenna module 430) of the base station 401. For example, data may include software (e.g., beam book information, beam information transmission module) and a protocol layer. The beam book information may include antenna information for each beam index (or identifier). The antenna information may include information associated with the angle (or direction) or the intensity of the antenna module 430. The beam information transmission module may be used to transmit the beam book information to a mobile edge computing (MEC) server (e.g., the MEC server 501 of FIG. 5).

To help understanding of the disclosure, description is provided by taking an MEC defined in the European telecommunication standards institute (ETSI) standard as an example, other edge servers may be usable. The protocol layer may include physical (PHY), media access control (MAC), radio link control (RLC), and packet data convergence protocol (PDCP). The beam information transmission module may include a protocol (e.g., at least a part of internet protocol (IP), and transmission control protocol (TCP)/user datagram protocol (UDP)) for transmission. The beam information transmission module may transmit the beam book information via the protocol layer (e.g., RLC/PDCP) to the protocol for transmission. As another example, the beam information transmission module may transmit, to the MEC server 501, the beam book information in another form defined between the base station 401 and the MEC server 501.

The communication module 420 may support establishing a wireless communication channel between the base station 401 and the outside (e.g., the electronic device 101, the MEC server 501), and performing communication via the established communication channel.

The antenna module 430 may transmit a signal to the outside (e.g., the electronic device 101) or may receive a signal from the outside. According to an embodiment of the disclosure, the antenna module 430 may include a single or multiple antenna arrays. An antenna array may include a plurality of antenna elements (not illustrated), and may perform transmission or reception by performing beamforming for, for example, an mmWave signal. The antenna module 430 may transmit or receive a signal at various phases (or directions) or at various intensities (amplitudes) of an antenna element. For example, the antenna module 430 may be embodied in the form of a dipole antenna or in the form of a patch antenna.

The processor 440 may execute software so as to control at least one other element (e.g., hardware or software element) of the base station 401 connected to the processor 440, and may perform various data processing or various operations. Although it is illustrated that a single process is included for ease of description, the base station 401 may include the multiple processors 440. The processor 440 may determine (or set) a beam index (or identifier) based on a transmission beam producible by the antenna module 230, and may determine antenna information corresponding to the beam index. The processor 440 may control the phase (or angle) and the signal strength (amplitude) of an antenna element, so as to form transmission beams which have predetermined beam widths and are transmitted in predetermined directions.

The antenna information may include angle or intensity information. The antenna information may include information associated with which antenna element is to be used for forming the angle of a beam that the antenna module 430 forms, and information associated with the intensity of each antenna element. The processor 440 may determine antenna information for each beam index, and may produce the beam book information. A single piece of antenna information corresponding to a single beam index may be referred to as 'beam information', and a plurality of pieces of antenna information corresponding to a plurality of beam indices may be referred to as 'beam book information'. The processor 440 may store the produced beam book information in the memory 410. The processor 440 may operate a protocol layer stored in the memory 410. For example, the processor 440 may support transferring the beam book information stored in the memory 410 via the protocol layer (e.g., RLC/PDCP) to a protocol for transmission (e.g., at least some of IP, TCP/UDP). The processor 440 may transfer the beam book information to the MEC server 501 via an interface that performs delivery to the protocol for transmission.

According to various embodiments of the disclosure, the processor 440 may collect device connection information related to an electronic device (e.g., the electronic device 101, the electronic device 102, and the electronic device 104 of FIG. 1) existing (or located) in the coverage area of the base station 401, and may transmit the same to the MEC server 501 via the IP layer. The device connection information may include at least one of the identifier of the electronic device 101, the beam information of the electronic device 101, the beam movement information of the electronic device 101, the radio resource information of the electronic device 101, the number of electronic devices included in a beam area, and the order of entry of electronic devices included in a beam area. The identifier of the electronic device 101 may be a unique number (e.g., a phone number) for identifying the electronic device 101. The beam information of the electronic device 101 may include beam information (e.g., a beam index, antenna information) that the electronic device 101 uses. The beam movement information of the electronic device 101 may include beam change information (or handover information) associated with a change of the location of the electronic device 101. The radio resource information of the electronic device 101 may include the amount of radio resources used by (or the amount of radio resources allocated to) the electronic device 101. The number of electronic devices may be the number of electronic devices existing in each beam area. The order of entry may be the order of entry of an electronic device that enters each beam area.

According to various embodiments of the disclosure, the processor 440 may map the beam book information to a beam area (or a cell). The beam area may be a location to which a beam arrives. A single piece of beam information may be mapped to a single beam area, and a plurality of pieces of beam information may be mapped to a single beam area. The processor 440 may transmit beam area information mapped to each beam information to the MEC server 501. The operation of mapping the beam book information to the beam area may or may not be performed by the base station 401.

The processor 440 may control the antenna module 430 based on the beam book information stored in the memory 410. The processor 450 may control the antenna module 430, so as to transmit a signal to the outside or to receive a signal from the outside (e.g., the electronic device 101, the MEC server 501).

Figure 5:
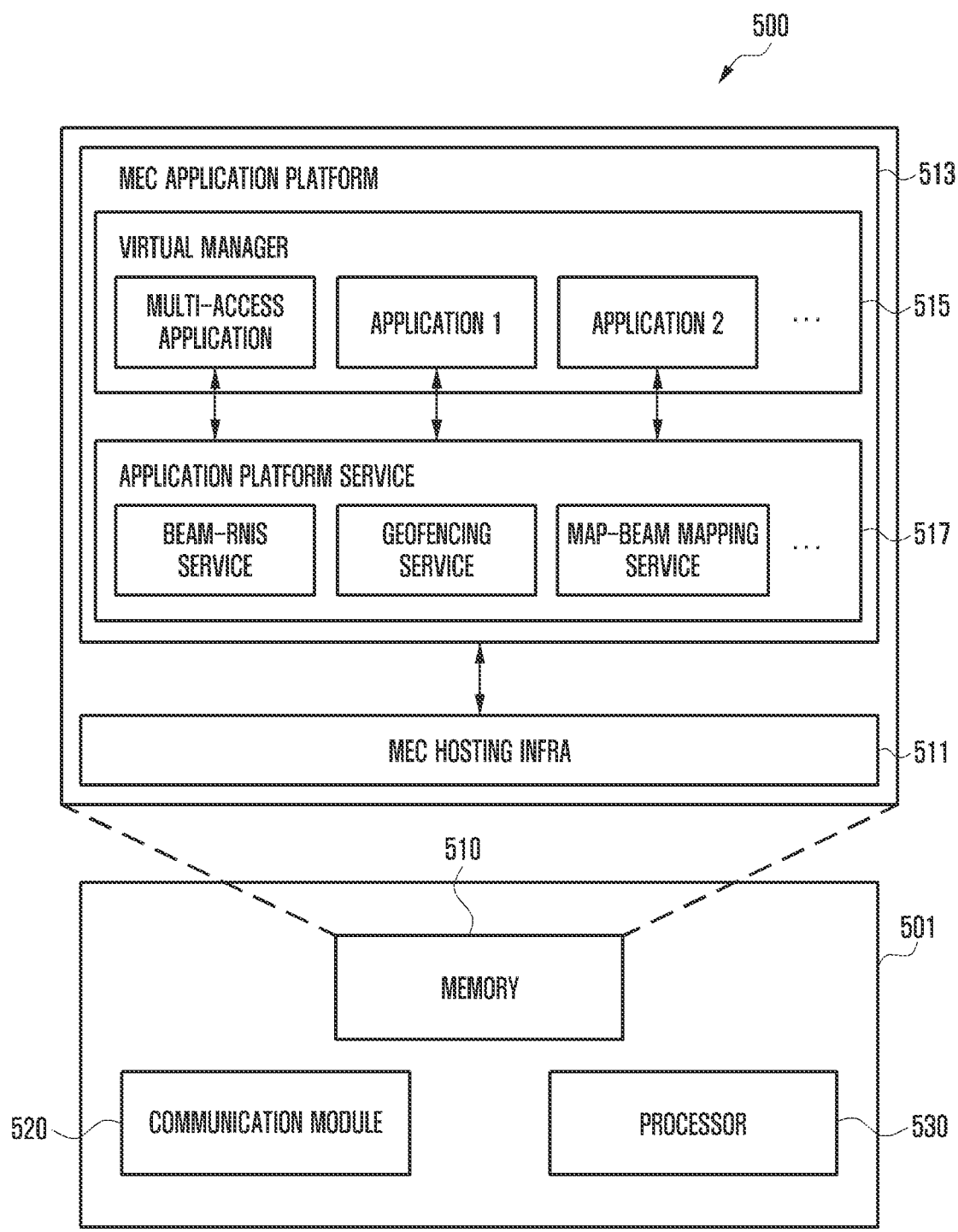
FIG. 5 is a block diagram illustrating a configuration of a mobile edge computing (MEC) server according to an embodiment of the disclosure.

FIG. 5 is a block diagram 500 illustrating a configuration of an MEC server according to an embodiment of the disclosure.

Referring to FIG. 5, an MEC server 501 may include a memory 510, a communication module 520, and a processor 530. The MEC server 501 may be mobile edge computing or multi-access edge computing. The MEC may provide a highly distributed computing environment which is capable of developing a service and application in a location close to a mobile user (e.g., the electronic device 101, the electronic device 102, and the electronic device 104 of FIG. 1), and is also capable of storing and processing a content. MEC applications may obtain wireless and network information in real time, and may perform control so as to provide a personalized and context recognizable service to mobile users.

The MEC 501 may be an MEC IT application server which is coupled with the base station 401. The MEC server 501 may provide a computing resource, a storage capability, a connection capability, a user traffic, and a capability of accessing to radio and network information, and may provide an effective and seamless service of various applications. The MEC server 501 may be located in an LTE base station, in or around an NR base station, in a core network, and in a multi-technology cell aggregation site. Alternatively, the multi-technology cell aggregation site may be located inside a company, such as a hospital or the headquarter of a major company, or may be located inside or outside a public building, a shopping mall, or a stadium, or the like, so as to control various types of wireless technology APs/base stations.

The memory 510 may store various types of data (e.g., beam book information, device connection information, service table) used by at least one element (e.g., the processor 530, the communication module 520) of the MEC server 501. The memory 510 may include an MEC server platform including a MEC hosting infra 511 and an MEC application platform 513. The MEC hosting infra 511 may include hardware resources and a virtual layer. The MEC hosting infra 511 may be abstracted and shown to applications hosted on the MEC application platform 513. The MEC hosting infra 511 may enable various implementation options for integration of the base station 401 and the MEC server 501.

The MEC application platform 513 may provide a service for hosted applications, and may include a virtual manager 515 and an application platform service 517. The virtual manager 515 may provide infrastructure as a service (IaaS) tools, so as to provide a real-time hosting environment which is flexible and efficient to applications and is multi-tenancy. Applications are performed on the IaaS, and may be distributed as a virtual machine (VM) image. The application platform service 517 may provide middleware services and infra-services. The infra-service may include a communication service that connects applications and services in the MEC server 501, and a service registry that manages and announces the list of services usable in the MEC server 501.

The middleware service may include radio network information service (RNIS) that provides real-time radio and network information to authorized applications, and may include a traffic offload function (TOF) that transmits a predetermined user plane traffic selected by a policy to authorized applications for processing. According to various embodiments of the disclosure, a beam-RNIS service may receive information associated with a beam (e.g., beam book information, information associated with a beam used by the predetermined electronic device 101, and information associated with the electronic device 101 in a beam area) from the base station 401. The beam-RNIS service may provide beam information received from the base station 401 to an application.

According to various embodiments of the disclosure, a geofencing service may be a service that receives geofence inputted from an application, monitors entry/exit of a predetermined user (e.g., the electronic device 101) to/from the geofence, and reports a change in the state of the application. The geofencing service may manage the geofence (e.g., a geofence input as a latitude/longitude area) input by the application based on beam area information corresponding to the base station 401 (e.g., mapping). For example, if an application registers New York, Manhattan XX store as geofence, 'geofencing service' may manage the same as a set (combination) of beams (e.g., a beam geographical area) of the predetermined base station 401.

According to various embodiments of the disclosure, a map-beam mapping service may be a service that maps geographical information and beam information (e.g., beam index) of a base station. For example, applications or other services (e.g., geofencing services) may obtain base station beam information corresponding to desired geographical information (e.g., New York, Manhattan) via 'map-beam mapping service'. Alternatively, an application or another service may obtain beam geographical information corresponding to desired base station beam information.

The MEC applications (e.g., a multi-access application, application 1, application 2) may be preferentially provided from a vender, a communication operator, or a third service operator, and may be performed on a virtual machine. An MEC server platform and a platform provision service may be completely independent from applications. Applications may be managed by application management systems associated thereto, and the application management systems may be a system which is dependent upon the applications. A life cycle management of an application may be performed in a MEC application platform management system.

The communication module 520 may support establishing a wireless communication channel between the MEC server 501 and the outside (e.g., the electronic device 101, the base station 401), and performing communication via the established communication channel. The communication module 520 may receive beam book information or device connection information from the base station 401.

The processor 530 may execute software so as to control at least one other element (e.g., hardware or software element) of the MEC server 501 connected to the processor 530, and may perform various data processing or various operations. Although it is illustrated that a single processor is included, the MEC server 501 may include a plurality of processors 530 or may further include a communication processor. The processor 530 may receive at least one piece of beam book information or at least one piece of device connection information from a plurality of base stations connected to the MEC server 501, via the RNIS.

Figure 11:
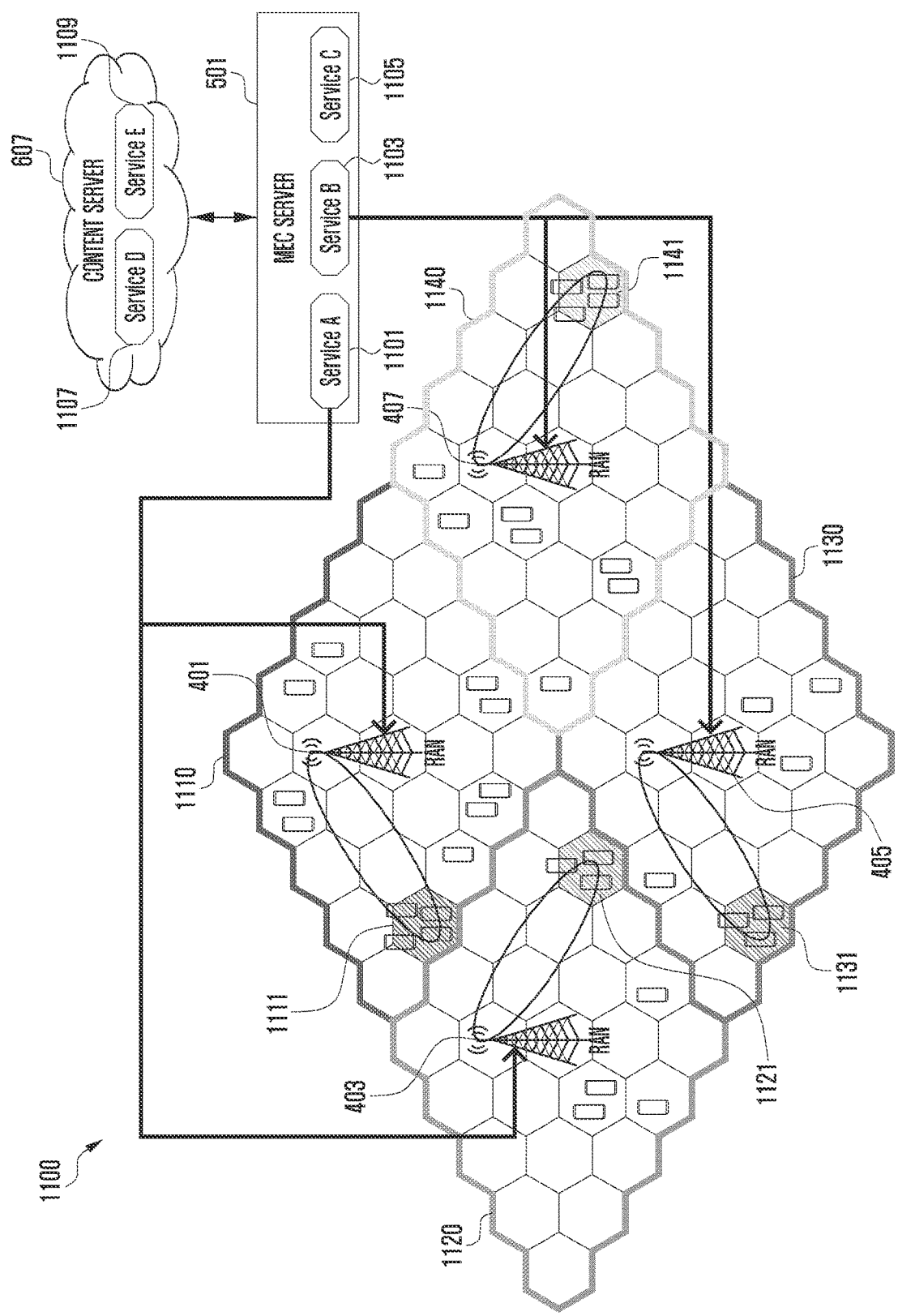
FIGS. 11, 12, and 13 are diagrams illustrating providing an area-based service by an MEC server according to various embodiments of the disclosure.

For example, the processor 530 may receive first beam book information from a first base station (e.g., the base station 401), may receive second beam book information from a second base station (e.g., the second base station 403 of FIG. 11), and may receive third beam book information from a third base station (e.g., the third base station 405 of FIG. 11). The processor 530 may separately manage each piece of beam book information, or may integrate pieces of beam book information of all connected base stations as a single piece of beam book information and manage the same.

According to various embodiments of the disclosure, the processor 530 may map the at least one piece of beam book information to a map. A single piece of antenna information corresponding to a single beam index may be referred to as 'beam information', and a plurality of pieces of antenna information corresponding to a plurality of beam indices may be referred to as 'beam book information'. The processor 530 may assign a single piece of beam information included in the at least one beam book information to a single beam geographical area or may group a plurality of pieces of beam information and assign the same to a single beam geographical area. According to an embodiment of the disclosure, the beam geographical area may be the coordinates of at least one area corresponding to beam information, geofencing information, or a geographical location, such as a map. For example, the beam geographical area may include geographical information of an area included in at least one beam coverage area corresponding to beam information. A single beam geographical area may include a single piece of beam information or a plurality of pieces of beam information.

The processor 530 may store beam geographical area information corresponding to the at least one beam book information in the memory 510. The beam geographical area may be determined based on service information. The processor 530 may map an area-based service set by a service application to beam book information, and may produce a service table. The service table may include beam information or beam geographical area information corresponding to service information (e.g., a service type). For example, first service information may correspond to first beam geographical area information, and the first beam geographical area information may include first to third beam information. Alternatively, second service information may correspond to second beam geographical area information and third beam geographical area information, and the second beam area information may include fifth to seventh beam information, and the third beam geographical area information may include ninth beam information and tenth beam information.

According to various embodiments of the disclosure, the processor 530 may determine whether to provide a service based on device connection information received in real time. The processor 530 may request information from the base station 401 in real time, periodically, or selectively, and may store the requested information in the memory 510. The processor 530 may determine whether to provide a service based on at least one of a service table or the device connection information stored in the memory 510. The processor 530 may transfer the device connection information to a multi-access application, and the multi-access application (or application 1 and application 2 of FIG. 5) may read the service table stored in the memory 510 and may provide an area-based service.

The processor 530 may provide a service different for each area to the electronic device 101 based on the device connection information and the service table. The processor 530 may provide a service or may suspend providing a service based on entry to (in) or exit from (out) a beam geographical area (e.g., the coverage area of each transmission beam of the base station 401, the coverage area of the base station 401, or some areas included in the coverage area of the base station 401). The processor 530 may provide a service to a limited number of users based on the number of electronic devices included in a beam geographical area, or may provide a differentiated service based on the order of entry to the beam geographical area. The processor 530 may provide a service different for each beam geographical area to the electronic device 101 by interoperating with a content server (e.g., a content server 607 of FIG. 6). The processor 530 may receive an information request from the content server 607, and may transmit at least one of the device connection information, the service table, or the beam book information stored in the memory 510 in response to the request.

Figure 6:
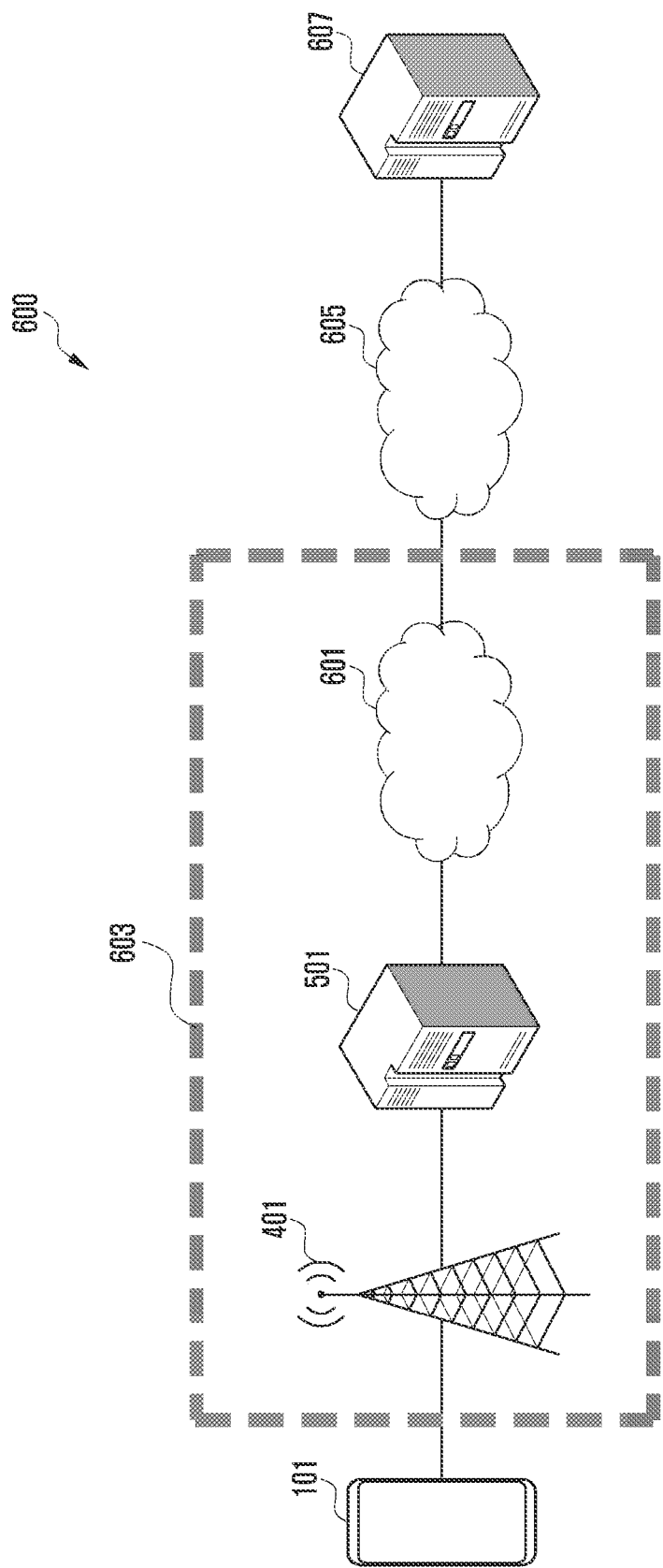
FIG. 6 is a diagram illustrating a service provision system based on beam book information according to an embodiment of the disclosure.

FIG. 6 is a diagram illustrating a service provision system based on beam book information according to an embodiment of the disclosure.

Referring to FIG. 6, a service provision system 600 based on beam book information may include an electronic device (e.g., the electronic device 101, the electronic device 102, the electronic device 104 of FIG. 1), a base station (e.g., the base station 401 of FIG. 4), an MEC server (e.g., the MEC server 501 of FIG. 5), or a content server 607.

The electronic device 101 may receive a mobile communication service via the base station 401. The base station 401 may belong to an access network, and may be connected to a subscriber (e.g., the electronic device 101). The base station 401 may be in charge of a function of processing the number of a subscriber, a function of connecting a service, and a function of transmitting or receiving information. The MEC server 501 may be connected to the base station 401, and may provide various services to the electronic device 101. The base station 401, the MEC server 501, and a core network 601 may be included in a mobile network 603 (e.g., the second network 199 of FIG. 1). The core network 601 may include a function of managing subscriber information, such as the number of a subscriber and the current location of a subscriber, a function of connecting a wired telephone network service, and a function of a server for providing other additional services. The content server 607 (e.g., the server 108 of FIG. 1) may belong to a data network 605, and may provide various services to the electronic device 101. The content server 607 may provide a service to the electronic device 101 by interoperating with the MEC server 501, or may directly provide a service to the electronic device 101. The content server 607 may receive at least one of beam book information, a service table, or device connection information from the MEC server 501, and may provide a service to the electronic device 101 based on at least one of the received beam book information, service table, or device connection information.

A base station (e.g., the base station 401 of FIG. 4) according to various embodiments may include an antenna module (e.g., the antenna module 430 of FIG. 4), an interface that performs delivery to a protocol for transmission, a memory (e.g., the memory 410 of FIG. 4), and a processor (e.g., the processor 440 of FIG. 4). The processor may be configured to determine antenna information for each beam index based on a transmission beam capable of being produced in the antenna module, to produce beam book information based on the determined antenna information, and to transmit the beam book information and device connection information related to an electronic device existing in the coverage area of the base station to an external server via the interface.

The processor may be configured to assign the beam index based on the angle or intensity of an antenna element included in the antenna module, and to produce the beam book information including antenna information corresponding to the assigned beam index.

The device connection information may be configured to include at least one of an identifier of the electronic device, beam information of the electronic device, beam movement information of the electronic device, radio resource information of the electronic device, a number of electronic devices in a beam area, or an order of entry of electronic devices in a beam area.

The processor may be configured to transmit the device connection information to the external server if at least one case is satisfied among a case in which a new electronic device enters a beam area associated with the coverage area of the base station, a case in which the electronic device leaves the beam area, and a case in which beam information of the electronic device is changed.

The processor may be configured to transmit the beam book information to the external server if a request for transmission of beam book information is received from the external server.

The processor may be configured to map the beam book information to a beam area, and to store the mapped beam area information in the memory.

A server (e.g., the MEC server 501 of FIG. 5) according to various embodiments may include a memory (e.g., the memory 510 of FIG. 5); and a processor (e.g., the processor 530 of FIG. 5), and the processor is configured to receive at least one piece of beam book information from at least one base station, to produce a service table based on the beam book information, and to provide an area-based service to an electronic device based on the service table.

The processor may be configured to map the beam book information to a beam geographical area, and to produce a service table based on the mapped information.

The processor may be configured to map beam geographical area information corresponding to the at least one beam book information, and to produce the service table by mapping an area-based service set by a service application to the beam book information.

The processor may be configured to receive a plurality of pieces of beam book information from a plurality of base stations connected to the server.

The processor may be configured to assign a single piece of beam information included in the at least one beam book information to a single beam area or to group a plurality of pieces of beam information included in the at least one beam book information so as to assign the same to a single beam area.

The processor may be configured to set the beam geographical area based on service information.

The processor may be configured to receive device connection information from the at least one base station, and to provide an area-based service to the electronic device based on the service table and the device connection information.

The processor may be configured to request transmission of beam book information from the at least one base station, and to receive the beam book information from the at least one base station that provides a response to the request.

The processor may be configured to provide an area-based service to an electronic device by interoperating with a content server.

The processor may be configured to transmit, to the content server, at least one of beam book information, a service table, or device connection information stored in the memory, in response to a request for information from the content server.

An electronic device (e.g., the electronic device 101 of FIG. 1) according to various embodiments may include a communication module (e.g., the communication module 190 of FIG. 1), a display (e.g., the display device 160 of FIG. 1), a memory (e.g., the memory 130 of FIG. 1), and a processor (e.g., the processor 120 of FIG. 1). The processor may be configured to receive service information from an external server via the communication module, to display the service information on a map image via the display, and to provide a service provided from the external server to a user.

The processor may be configured to receive beam area information or beam book information corresponding to the current location of the electronic device or a location of interest from the external server, and to display, based on the beam area information, the service information on the map image in the form of a beam area.

The processor may be configured to limit a beamforming range based on the beam book information.

The processor may be configured to monitor whether deviation from the service area occurs, and to provide a guidance to a user based on the result of monitoring.

Figure 7:
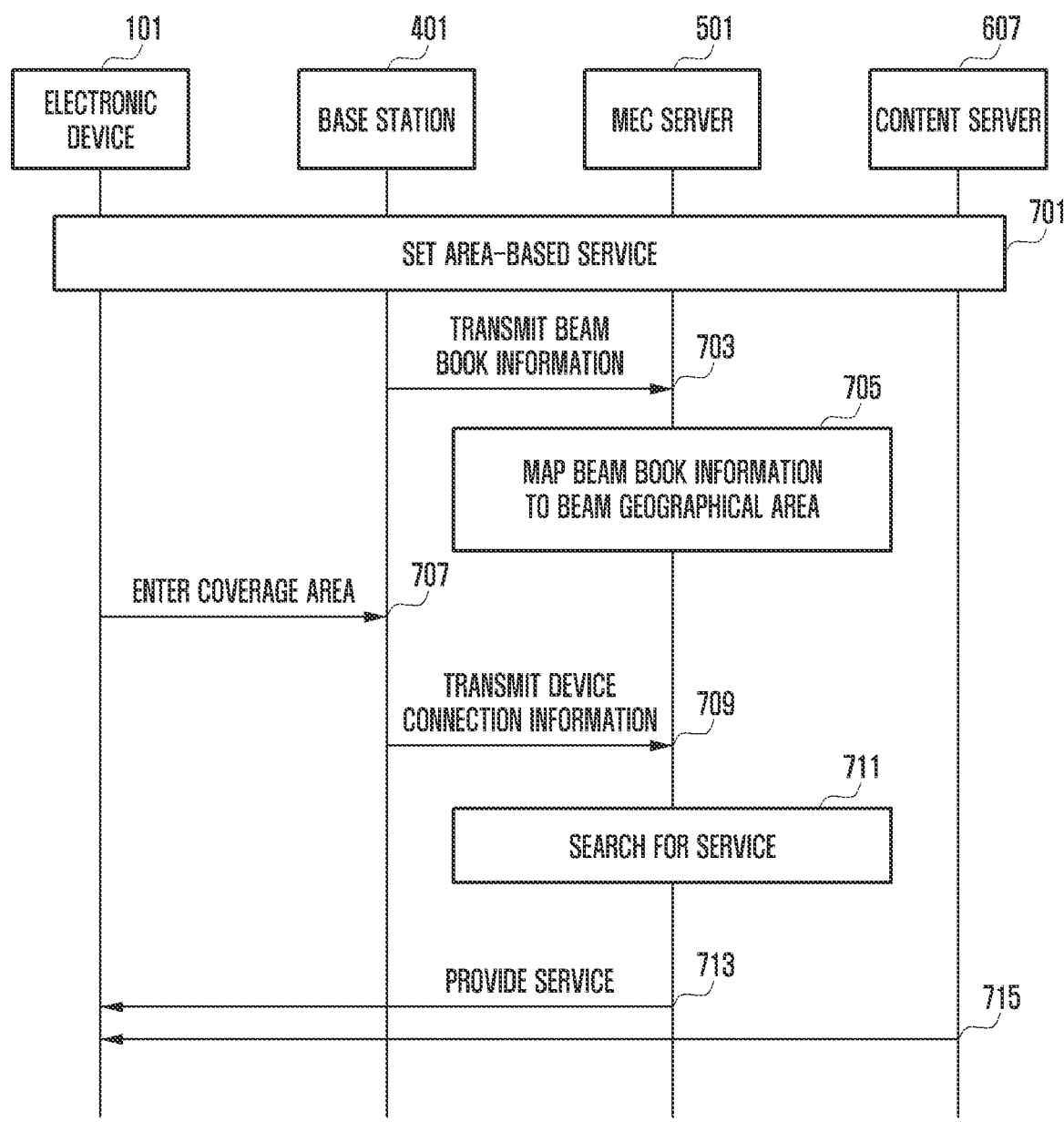
FIG. 7 is a flowchart illustrating a service provision method based on beam book information according to an embodiment of the disclosure.

FIG. 7 is a flowchart 700 illustrating a service provision method based on beam book information according to an embodiment of the disclosure.

Referring to FIG. 7, in operation 701, an electronic device (e.g., the electronic device 101, the electronic device 102, the electronic device 104 of FIG. 1) according to various embodiments of the disclosure, a base station (e.g., the base station 401 of FIG. 4), an MEC server (e.g., the MEC server 501 of FIG. 5), or a content server 607 may set a beam area-based service. A user application for providing a service based on beam book information may be installed in the electronic device 101. The electronic device 101 may execute the user application based on a user input, and may receive information related to a beam area-based service (e.g., a geofence area setting, whether to provide a service) which is registered by the executed user application. The electronic device 101 may transmit the information related to the beam area-based service to the MEC server 501.

The MEC server 501 may include a multi-access application or another application (e.g., application 1 and application 2 of FIG. 5) for providing a service based on beam book information by interoperating with a user application of the electronic device 101. The MEC server 501 may register, with a multi-access application, information related to a beam area-based service received from the electronic device 101. The content server 607 may include a remote application for providing a service based on beam book information by interoperating with the user application of the electronic device 101. The content server 607 may register information related to a beam area-based service of the electronic device 101 with the remote application by interoperating with the MEC server 501 or by directly communicating with the electronic device 101.

According to various embodiments of the disclosure, in operation 703, the base station 401 (e.g., the processor 440 of the base station 401) may transmit beam book information to the MEC server 501. The base station 401 may determine antenna information for each beam index, and may produce the beam book information. A single piece of antenna information corresponding to a single beam index may be referred to as 'beam information', and a plurality of pieces of antenna information corresponding to a plurality of beam indices may be referred to as 'beam book information'. The base station 401 may periodically or selectively transmit the beam book information to the MEC server 501. The base station 401 may transmit the beam book information to the MEC server 501 in response to a transmission request from the MEC server 501.

According to various embodiments of the disclosure, in operation 705, the MEC server 501 (e.g., the processor 530 of the MEC server 501) may map the beam book information to a beam geographical area. The MEC server 501 may receive at least one piece of beam book information from a plurality of base stations connected to the MEC server 501, and may map the received beam book information to a beam geographical area. For example, the beam geographical area may be a geographical location, and may include coordinates, geofencing information, or a map. The MEC server 501 may assign a single piece of beam information included in the beam book information to a single beam geographical area or may group a plurality of pieces of beam information and may assign the same to a single beam geographical area. A single beam geographical area may include a single piece of beam information or a plurality of pieces of beam information. The MEC server 501 may map a beam geographical area-based service set by a service application to beam book information, so as to produce a service table.

According to various embodiments of the disclosure, in operation 707, the electronic device 101 may enter the coverage area of the base station 401. The electronic device 101 may enter the coverage area of the base station 401 according to a location change, and may perform communication with the base station 401 via beamforming. The electronic device 101 may receive each synchronization signal block (SSB) from the base station 401, and may determine a reception beam using the received SSB, in order to obtain a transmission and reception beam pair. The base station 401 may configure as many SSBs as the number of producible transmission beams as one set, and may periodically transmit the SSB set. The electronic device 101 may measure a reception intensity (or reception power) using a single producible reception beam for each SSB set, and may find out an optimal reception beam for a transmission beam corresponding to the corresponding SSB.

According to various embodiments of the disclosure, in operation 709, the base station 401 may transmit device connection information to the MEC server 501. The base station 401 may transmit, to the MEC server 501, the device connection information including at least one of the identifier of the electronic device 101, the beam information of the electronic device 101, the beam movement information of the electronic device 101, the radio resource information of the electronic device 101, the number of electronic devices included in a beam area, and the order of entry of electronic devices included in a beam area. The base station 401 may transmit the device connection information to the MEC server 501 in real time, periodically, or selectively.

In operation 711, the MEC server 501 may search for a service to be provided to the electronic device 101. The MEC server 501 may determine whether to provide a service based on a service table or the device connection information stored in a memory (e.g., the memory 510 of FIG. 5). The processor 530 may transfer the device connection information to the multi-access application, and the multi-access application may read the service table stored in the memory 510 and may provide a beam area-based service.

In operation 713, the MEC server 501 may provide a beam area-based service to the electronic device 101. The MEC server 501 may provide a first service if the electronic device 101 is located in a first area (or a beam geographical area), and may provide a second service if the electronic device 101 is located in a second area.

In operation 715, the content server 407 may provide an area-based service to the electronic device 101. The content server 407 may provide an area-based service to the electronic device 101 by interoperating with the MEC server 501, and may directly provide an area-based service to the electronic device 101. For example, the content server 407 may request information from the MEC server 501, may receive at least one of beam book information, a service table, or device connection information from the MEC server 501 in response to the request, and may provide an area-based service to the electronic device 101 based on at least one of the received beam book information, service table, or device connection information. The electronic device 101 may provide a first service (e.g., a fourth service 1107 of FIG. 11) if the electronic device 101 is located in a first area, and the electronic device 101 may provide a second service (e.g., a fifth service 1109 of FIG. 11) if the electronic device 101 is located in a second area.

Figure 8:
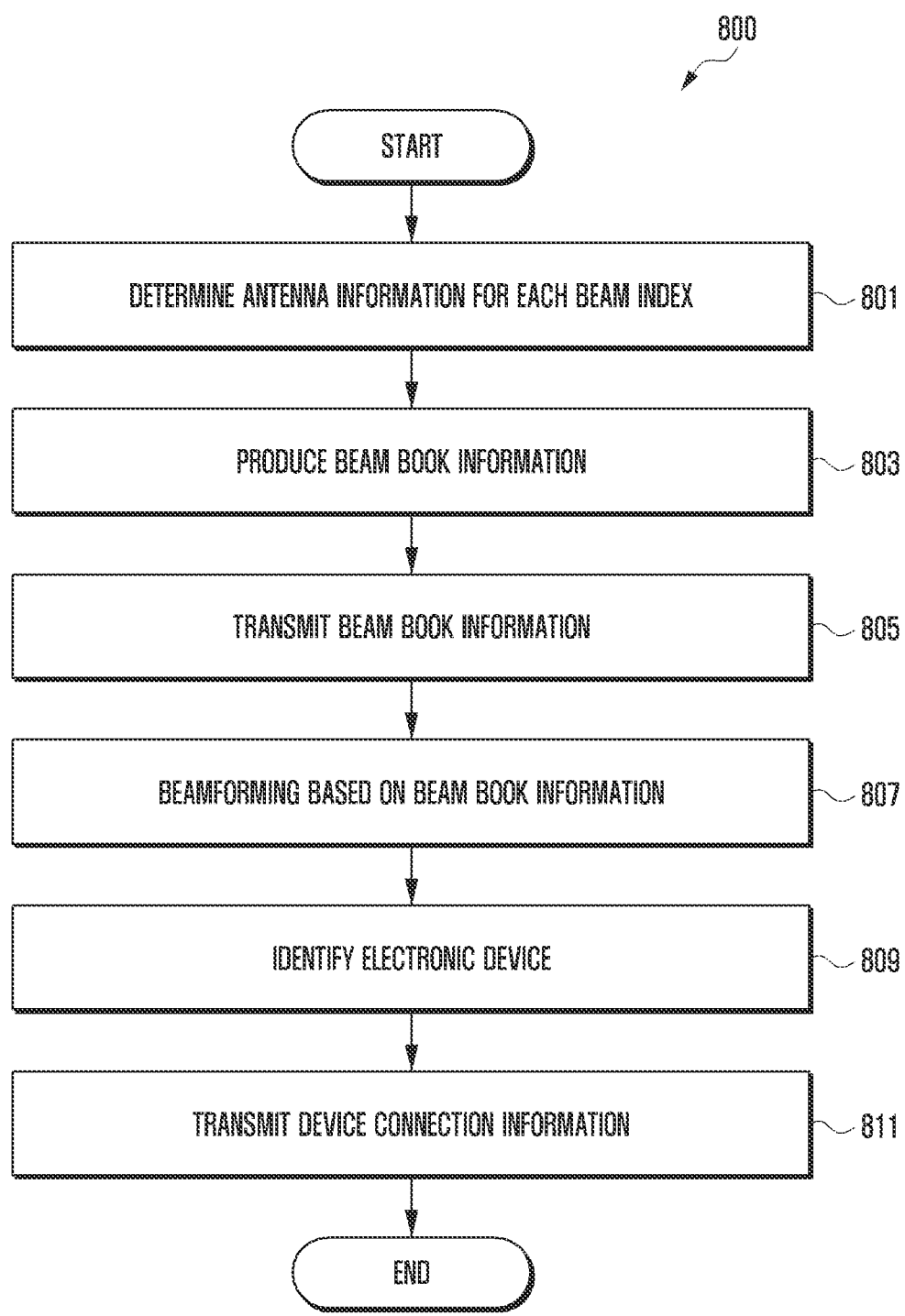
FIG. 8 is a flowchart illustrating a method of operating a base station according to an embodiment of the disclosure.

FIG. 8 is a flowchart 800 illustrating a method of operating a base station according to an embodiment of the disclosure.

Referring to FIG. 8, in operation 801, a processor (e.g., the processor 440 of FIG. 4) of a base station (e.g., the base station 401 of FIG. 4) according to various embodiments may determine antenna information for each beam index. The processor 440 may determine a beam index based on a transmission beam producible by an antenna module (e.g., the antenna module 430 of FIG. 4) of the base station 401. The processor 440 may control the phase and the signal strength (amplitude) of an antenna element, so as to form transmission beams which have predetermined beam widths and are transmitted in predetermined directions. For example, the processor 440 may assign (or set) a first beam to have a first angle (e.g., 0°) or a first strength (e.g., 3 dB), and may assign a second beam to have a second angle (e.g., 10°) or a second strength (e.g., 6 dB), and may assign a third beam to have a third angle (e.g., 20°) or a third strength (e.g., 9 dB). Information associated with an angle or strength may be antenna information. The processor 440 may determine antenna information corresponding to each beam index.

In operation 803, the processor 440 may produce beam book information. The beam book information may include antenna information (e.g., angle or strength) corresponding to a beam index (e.g., beam 1, beam 2, beam 3). A single piece of antenna information corresponding to a single beam index may be referred to as 'beam information', and a plurality of pieces of antenna information corresponding to a plurality of beam indices may be referred to as 'beam book information'. The processor 440 may store the beam book information in a memory (e.g., the memory 410 of FIG. 4). According to various embodiments of the disclosure, the processor 440 may map the beam book information to a beam area (or a cell). The beam area may be a location to which a beam arrives. A single piece of beam book information may be mapped to a single beam area, and a plurality of pieces of beam book information may be mapped to a single beam area. For example, the processor 140 may map first beam book information to a first beam area, and may map second beam book information to a second beam area.

In operation 805, the processor 440 may transmit the beam book information to the MEC server (e.g., the MEC server 501 of FIG. 5) via a protocol for transmission (at least some of IP, TCP/UDP). The processor 440 may transmit beam area information to which beam book information is mapped, to the MEC server 501. According to various embodiments of the disclosure, the processor 440 may receive a request for transmission of the beam book information from the MEC server 501, and may transmit the beam book information in response to the request. The processor 440 may periodically or selectively transmit the beam book information. For example, the processor 440 may change (or update) the beam book information based on the antenna module 430, and may transmit the changed beam book information to the MEC server 501.

In operation 807, the processor 440 may perform beamforming based on the beam book information. The processor 440 may sequentially transmit a plurality of transmission beams, for example, the first to fifth transmission beams which have different angles or strengths, so as to perform at least one transmission beam sweeping. The first to fifth transmission beams may include at least one synchronization sequences (SS)/physical broadcast channel (PBCH) block (SS/PBCH block). The SS/PBCH block may be used for periodically measuring a channel of the electronic device 101 or a beam intensity. According to another embodiment of the disclosure, the first the fifth transmission beams may include at least one channel state information-reference signal (CSI-RS). The CSI-RS is a reference signal that the base station 401 may flexibly set, and may be periodically/semi-persistently, or aperiodically transmitted.

In operation 809, the processor 440 may identify an electronic device (e.g., the electronic device 101, the electronic device 102, and the electronic device 104 of FIG. 1). The processor 440 may receive a reception beam from the electronic device 101 in response to a transmission beam transmitted by beamforming, and may identify the electronic device 101. The electronic device 101 may perform reception beam sweeping while the base station 401 performs transmission beam sweeping. For example, while the base station 401 performs first transmission beam sweeping, a first antenna module (e.g., the first antenna module 242 of FIG. 2) of the electronic device 101 may fix a first reception beam in a first direction and may receive a signal of an SS/PBCH block transmitted via at least one of the first to fifth transmission beams.

While the base station 401 performs second transmission beam sweeping, the first antenna module 242 of the electronic device 101 may fix a second reception beam in a second direction, and may receive a signal of an SS/PBCH block transmitted via the first to fifth transmission beams. As described above, the electronic device 101 may select a communicable reception beam (e.g., the second reception beam and a third reception beam) based on the result of reception via reception beam sweeping. After determining communicable transmission and reception beams, the base station 401 and the electronic device 101 may transmit and/or receive basic information for cell configuration, and may configure additional beam operation information based on the same. For example, the beam operation information may include detailed information associated with a configured beam, an SS/PBCH block, and configuration information associated with a CSI-RS or additional reference signal.

In operation 811, the processor 440 may transmit device connection information to the MEC server 501. The device connection information may include information associated with the electronic device 101 identified in operation 809. For example, the device connection information may include at least one of the identifier of the electronic device 101, the beam information of the electronic device 101, the beam movement information of the electronic device 101, the radio resource information of the electronic device 101, the number of electronic devices included in a beam area, and the order of entry of electronic devices included in a beam area. The identifier of the electronic device 101 may be a unique number (e.g., a phone number) for identifying the electronic device 101. The beam information of the electronic device 101 may include beam information (e.g., a beam index, antenna information) that the electronic device 101 uses. The beam movement information of the electronic device 101 may include beam change information associated with a change of the location of the electronic device 101. The radio resource information of the electronic device 101 may include the amount of radio resources used by (or the amount of radio resources allocated to) the electronic device 101.

According to various embodiments of the disclosure, the processor 440 may store the device connection information in the memory 410. The processor 440 may periodically or selectively transmit the device connection information to the MEC server 501. For example, the processor 440 may transmit the device connection information to the MEC server 501 if at least one case is satisfied among the case in which a new electronic device enters a beam area associated with the coverage area (or a beam coverage area) of the base station 401, the case in which the electronic device 101 leaves the beam area, and the case in which the beam information of the electronic device 101 is changed. Alternatively, the processor 440 may receive a request for the device connection information associated with a predetermined electronic device from the MEC server 501, and may transmit the device connection information associated with the predetermined electronic device to the MEC server 501 in response to the request.

Figure 9A:
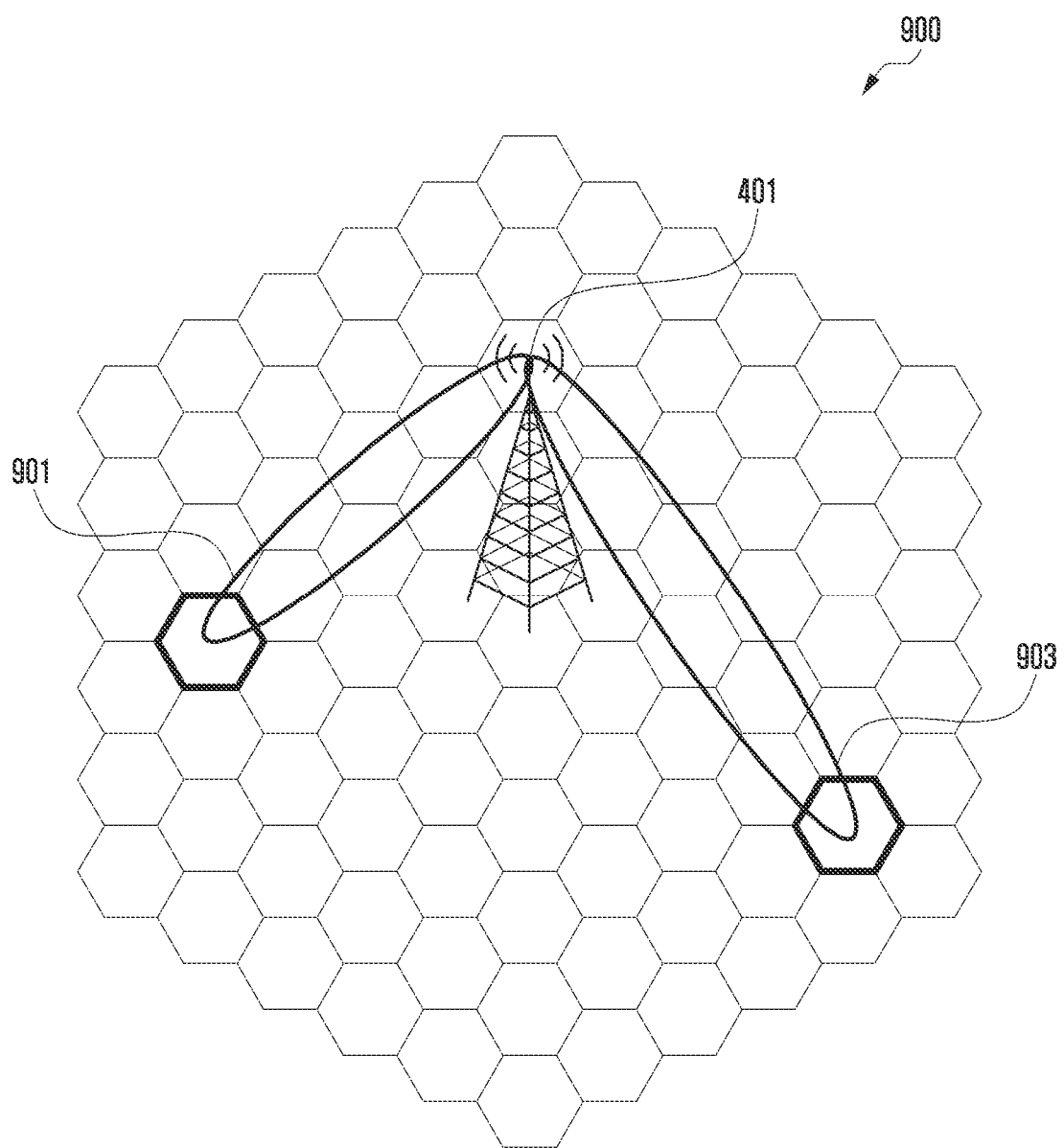
Figure 9B:
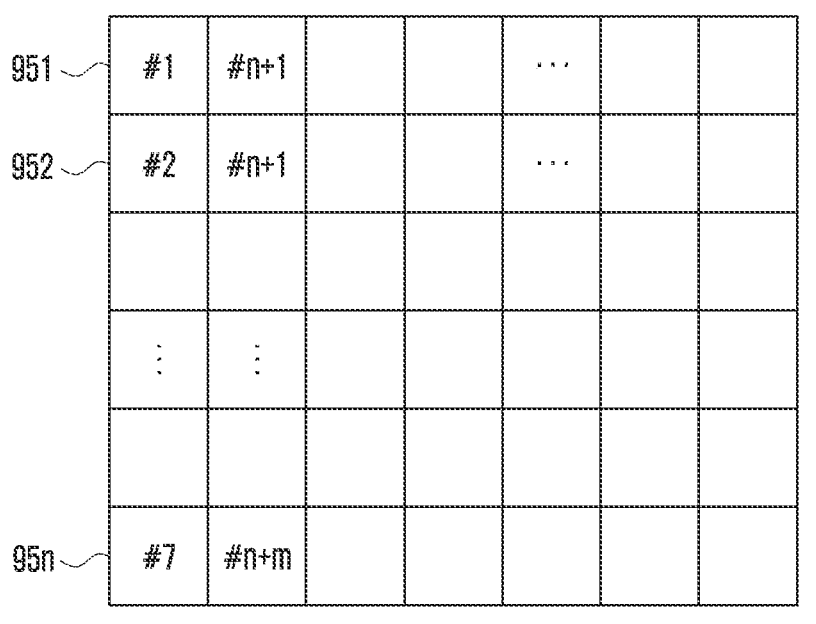

FIGS. 9A and 9B are diagrams illustrating producing beam book information by a base station according to various embodiments of the disclosure.

FIG. 9A is a diagram illustrating assigning a beam by a base station according to an embodiment of the disclosure.

Referring to FIG. 9A, a processor (e.g., the processor 440 of FIG. 4) of a base station (e.g., the base station 401 of FIG. 4) according to various embodiments may assign a beam (e.g., a first beam 901, a second beam 903) by adjusting the angle and strength of an antenna module (e.g., the antenna module 430 of FIG. 4) in a coverage area 900 of the base station 401. For example, the processor 440 may determine a beam index based on a transmission beam producible by the antenna module 430. For example, the processor 440 may assign the first beam 901 to have a first angle (e.g., 50°) or a first strength (e.g., 20 dB), and may assign the second beam 903 to have a second angle (e.g., 120°) or a second strength (e.g., 30 dB). Information associated with an angle or strength may be antenna information. The processor 440 may determine antenna information corresponding to each beam index.

FIG. 9B is a diagram illustrating producing beam book information by a base station according to an embodiment of the disclosure.

Referring to FIG. 9B, the processor 440 may determine antenna information corresponding to each beam index, and may produce beam book information. The beam book information may include antenna information for each of a first beam 951, a second beam 952, an $n^{th}$ beam 95n (n is a natural number), an $n+1^{th}$ beam, and an $n+2^{th}$ beam to an $n+m^{th}$ beam (m is a natural number). According to various embodiments of the disclosure, the processor 440 may map the beam book information to a beam area (or a cell). The beam area may be a location to which a beam arrives. The processor 440 may transmit beam area information which is mapped to beam book information, to the MEC server 501.

FIG. 10 is a flowchart 1000 illustrating a method of operating an MEC server according to an embodiment of the disclosure.

Referring to FIG. 10, in operation 1001, a processor (e.g., the processor 530 of FIG. 5) of an MEC server (e.g., the MEC server 501 of FIG. 5) according to various embodiments may receive at least one piece of beam book information from a base station (e.g., the base station 401 of FIG. 4). The processor 530 may receive one or more pieces of beam book information from one or more base stations. For example, the processor 530 may receive first beam book information from a first base station (e.g., the base station 401), may receive second beam book information from a second base station (e.g., the second base station 403 of FIG. 11), and may receive third beam book information from a third base station (e.g., the third base station 405 of FIG. 11). The processor 530 may store the at least one piece of received beam book information in a memory (e.g., the memory 510 of FIG. 5).

In operation 1003, the processor 530 may map the beam book information to a beam geographical area. If the first beam book information, the second beam book information, and the third beam book information to a beam geographical area, at least some of the first beam book information, the second beam book information, and the third beam book information may overlappingly appear on a map. The processor 530 may assign a single piece of beam information included in the at least one beam book information to a single beam geographical area or may group a plurality of pieces of beam information included in the at least one beam book information and may assign the same to a single beam geographical area. A single beam geographical area may include a single piece of beam information or a plurality of pieces of beam information. The beam geographical area may be the coordinates of at least one area corresponding to beam information, geofencing information, or a geographical location, such as a map.

In operation 1005, the processor 530 may store the mapped information in the memory 510. The processor 530 may store beam geographical area information corresponding to the at least one beam book information in the memory 510. According to various embodiments of the disclosure, in the case of mapping the beam book information to a map, a beam geographical area may be set based on service information. The service information may be information associated with a service provided by the MEC server 501, or information associated with a service provided by a content server (e.g., the content server 607 of FIG. 6). The service information may include a service type ((e.g., augmented reality), a virtual reality, a geofence in/out alarm), a service location, or a service time. For example, the processor 530 may set a beam geographical area based on service information in order to provide a service differentiated for each beam geographical area.

In operation 1007, the processor 530 may produce a service table based on the mapped information. The processor 530 may map an area-based service set by a service application to beam book information, so as to produce a service table. The processor 530 may store the produced service table in the memory 510. The service table may include beam information or beam geographical area information corresponding to service information (e.g., a service type, a service location, a service time). For example, first service information may correspond to first beam geographical area information, and the first beam geographical area information may include first to third beam information. Alternatively, second service information may correspond to second beam geographical area information and third beam geographical area information, and the second beam geographical area information may include fifth to seventh beam information, and the third beam geographical area information may include ninth beam information and tenth beam information.

In operation 1009, the processor 530 may receive device connection information from the base station 401. The processor 530 may receive the device connection information from the base station 401, in real time, periodically, or selectively. Alternatively, the processor 530 may request, from the base station 401, device connection information associated with a predetermined electronic device that subscribes to a service, and may receive the device connection information associated with the predetermined electronic device from the base station 401 in response to the request.

In operation 1011, the processor 530 may provide a service to the electronic device 101. The processor 530 may provide a service to the electronic device 101 based on the device connection information and the service table. The processor 530 may transfer the device connection information to an application, and the application may read the service table stored in the memory 510 and may provide an area-based service. If the electronic device 101 is a subscriber to a service, and the electronic device 101 is located in a beam geographical area that provides the service, the processor 530 may provide a service to the electronic device 101. The processor 530 may provide a service different for each beam geographical area to the electronic device 101 based on the device connection information and the service table. For example, the processor 530 may provide a service or may suspend providing a service, based on entry to (in) or exit from (out) a beam geographical area. The processor 530 may provide a service to a limited number of users based on the number of electronic devices included in a beam geographical area, or may provide a differentiated service based on the order of entry to the beam geographical area.

Figure 12:
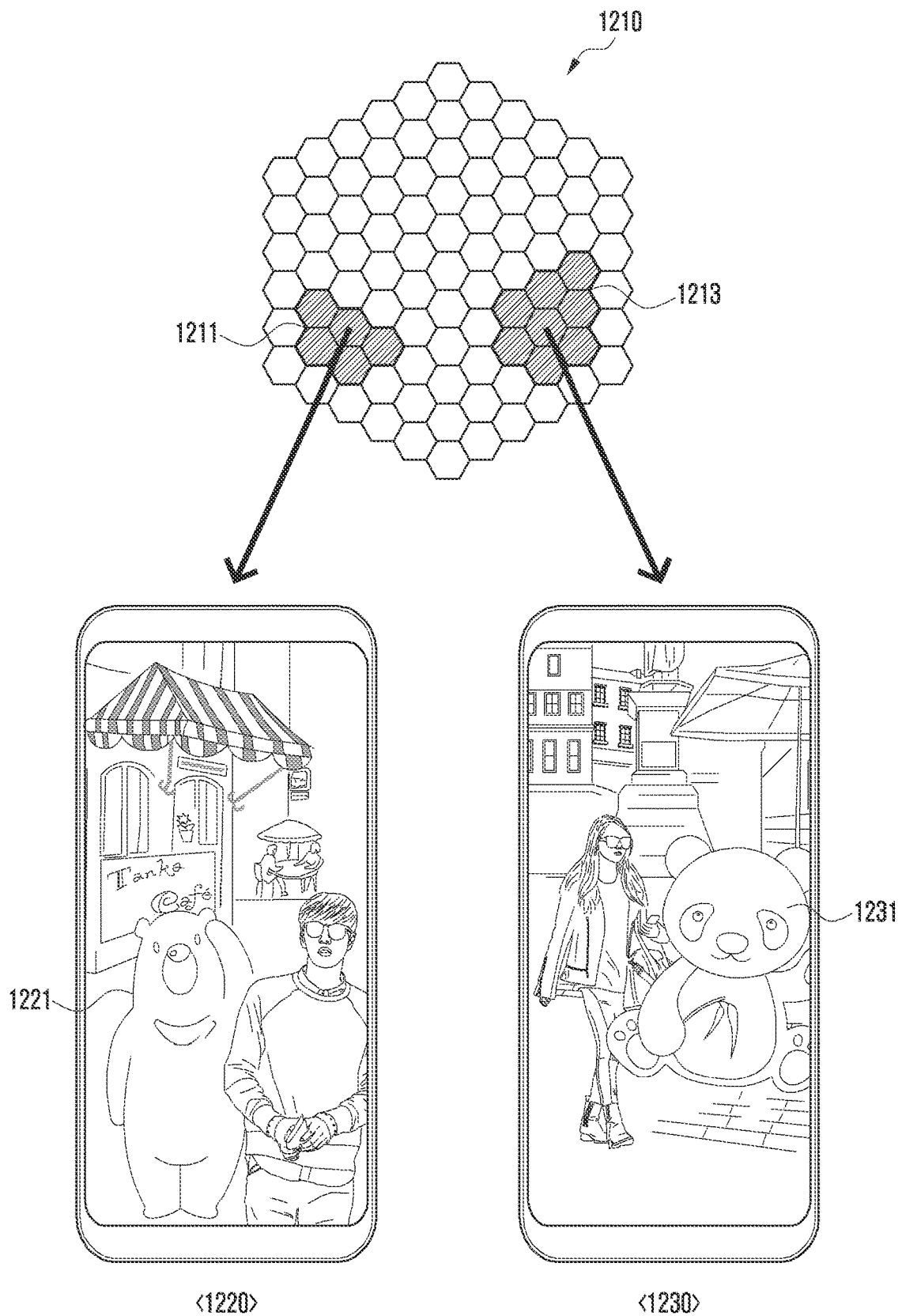
Figure 13:
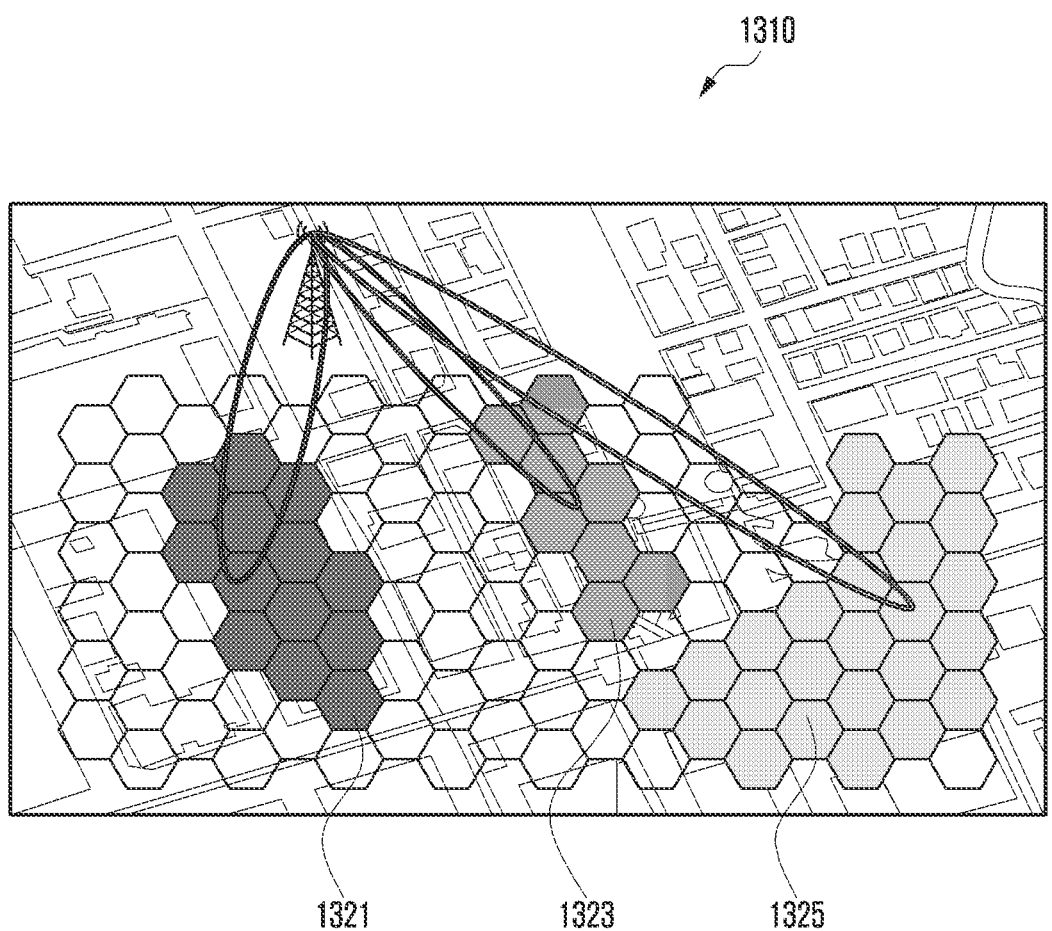

FIGS. 11, 12, and 13 are diagrams illustrating providing an area-based service by an MEC server according to various embodiments of the disclosure.

FIG. 11 is a diagram 1100 illustrating of providing an area-based service by an MEC server according to an embodiment of the disclosure.

Referring to FIG. 11, an MEC server (e.g., the MEC server 501 of FIG. 5) according to various embodiments may receive a plurality of pieces of beam book information or device connection information from a plurality of base stations connected to the MEC server 501. The MEC server 501 may receive first beam book information from the first base station 401, may receive second beam book information from the second base station 403, may receive third beam book information from the third base station 405, and may receive fourth beam book information from the fourth base station 407. The MEC server 501 may map the first to fourth beam book information to a map, and may produce a service table based on the mapped information. The MEC server 501 may store the produced service table in a memory (e.g., the memory 510 of FIG. 5). The service table may include beam geographical area information or beam information corresponding to a first service (service A) 1101, may include beam geographical area information or beam information corresponding to a second service 1103, and may include beam geographical area information or beam information corresponding to a third service 1105.

In addition, the MEC server 501 may receive, from the first base station 401, device connection information of an electronic device located in a first coverage area 1110 of the first base station 401. The MEC server 501 may receive, from the second base station 403, device connection information of an electronic device located in a second coverage area 1120 of the second base station 403. The MEC server 501 may receive, from the third base station 405, device connection information of an electronic device located in a third coverage area 1130 of the third base station 405. The MEC server 501 may receive, from the fourth base station 407, device connection information of an electronic device located in a fourth coverage area 1140 of the fourth base station 407.

According to various embodiments of the disclosure, the MEC server 501 may provide a service to an electronic device (e.g., the electronic device 101, the electronic device 102, the electronic device 104 of FIG. 1) based on the service table or the device connection information. For example, the MEC server 501 may provide a service to a beam geographical area of each base station where the largest number of electronic devices are located. The MEC server 501 may provide the first service 1101 to an electronic device included in a first beam geographical area 1111 of the first base station 401, and may provide the first service 1101 to an electronic device included in a second beam geographical area 1121 of the second base station 403. The MEC server 501 may provide the second service 1103 to an electronic device included in a third beam geographical area 1131 of the third base station 405, and may provide the second service 1103 to an electronic device included in a fourth beam geographical area 1141 of the fourth base station 407.

According to various embodiments of the disclosure, the content server 407 may provide a beam geographical area-based service to an electronic device by interoperating with the MEC server 501. For example, the content server 407 may request information from the MEC server 501, may receive at least one of beam book information, a service table, or device connection information from the MEC server 501 in response to the request, and may provide a beam geographical area-based service to the electronic device based on at least one of the received beam book information, service table, or device connection information. The content server 407 may provide the fourth service 1107 or the fifth service 1109 by interoperating with the MEC server 501, or may provide the fourth service 1107 or the fifth service 1109 directly to the electronic device.

FIG. 12 is a diagram illustrating providing a beam geographical area-based service by an MEC server according to an embodiment of the disclosure.

Referring to FIG. 12, an MEC server (the MEC server 501 of FIG. 5) according to various embodiments may provide a service to an electronic device (e.g., the electronic device 101, the electronic device 102, and the electronic device 104 of FIG. 1) based on a service table or device connection information. The MEC server 501 may provide different services corresponding to a plurality of areas (e.g., a first area 1211, a second area 1213) included in a predetermined region 1210 (e.g., a zoo, an amusement park). For example, the MEC server 501 may provide a first service to the electronic device 101 located in the first area 1211 and may provide a second service to the electronic device 102 located in the second area 1213. The first service may provide a first AR character 1221 and the second service may provide a second AR character 1231. For example, the electronic device 101 may display a first user interface 1220 on a display (e.g., the display device 160) by executing a camera application. The first AR character 1221 may be displayed on the first user interface 1220. An electronic device 1212 may display a second user interface 1230 on a display by executing a camera application. The second AR character 1231 may be displayed on the second user interface 1230. The MEC server 501 may provide a different service depending on an area where the electronic device belongs to although the electronic device is in the predetermined region 1210.

FIG. 13 is a diagram illustrating providing an area-based service by an MEC server according to an embodiment of the disclosure.

Referring to FIG. 13, an MEC server (e.g., the MEC server 501 of FIG. 5) according to various embodiments may receive beam book information from a base station (e.g., the base station 401 of FIG. 4), and may map the beam book information to a map 1310, so as to set beam geographical area information corresponding to the beam book information. The MEC server 501 may map a beam geographical area-based service set by a service application to beam book information, so as to produce a service table. The beam geographical area information may be set based on service information. The MEC server 501 may set first beam geographical area information 1321 corresponding to first service information, may set second beam geographical area information 1323 corresponding to second service information, and may set third beam geographical area information 1325 corresponding to third service information. The MEC server 501 may provide a service to an electronic device (e.g., the electronic device 101, the electronic device 102, and the electronic device 104 of FIG. 1) based on the service table or the device connection information received from the base station 401. The MEC server 501 may provide a first service (e.g., a first-come-first-served event based on the order of entry) to the electronic device 101 located in the first beam geographical area information 1321, may provide a second service (e.g., providing a service to a limited number of electronic devices) to the electronic device 102 located in the second beam geographical area information 1323, and may provide a third service (e.g., providing a coupon) to the electronic device 104 located in the third beam geographical area information 1325.

Figure 14:
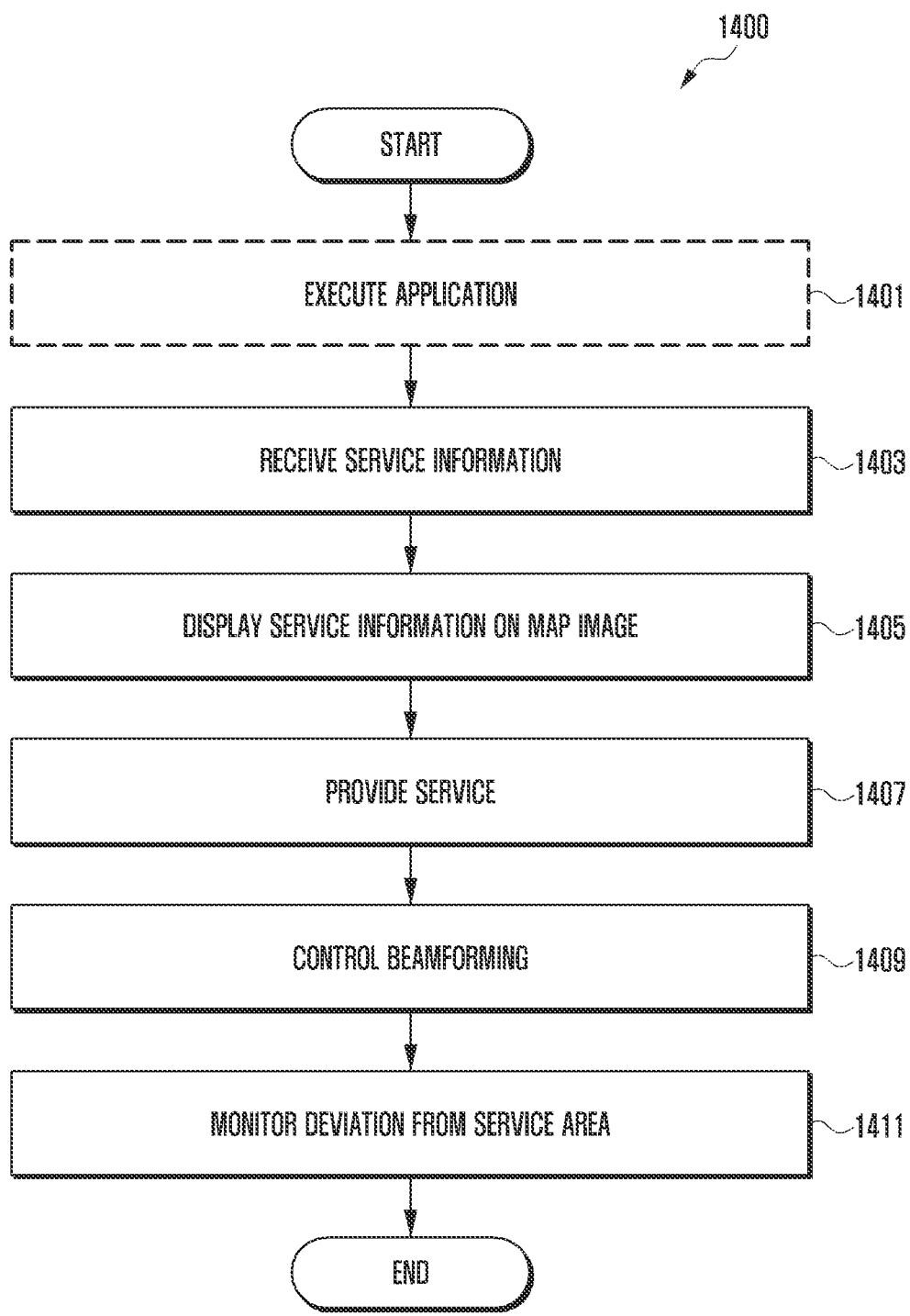
FIG. 14 is a flowchart illustrating a method of operating an electronic device according to an embodiment of the disclosure.

FIG. 14 is a flowchart illustrating a method of operating an electronic device according to an embodiment according to an embodiment of the disclosure.

Referring to FIG. 14, in operation 1401, a processor (e.g., the processor 120 of FIG. 1) of an electronic device (e.g., the electronic device 101 of FIG. 1) according to various embodiments may execute an application. The application may be a user application for providing a service based on beam book information. The processor 120 may set, based on a user input provided via an input device (e.g., the input device 150 of FIG. 1), a beam area-based service via the executed application. For example, based on the user input, the processor 120 may set a geofence area or may set whether to provide a service or a notification, or the like. Alternatively, the processor 120 may execute the application according to a selection by a user after entry to the geofence area set by the user. Operation 1401 may be omitted depending on the implementation of the electronic device 101.

In operation 1403, the processor 120 may receive service information. The processor 120 may receive service information from an MEC server (e.g., the MEC server 501 of FIG. 5) via the executed application. The processor 120 may receive service information via a multi-access application of the MEC server 501 that interoperates with the user application. Alternatively, the processor 120 may receive service information from a content server (e.g., the content server 607 of FIG. 6). The processor 120 may receive service information via a remote application of the content server 607 that interoperates with the user application. The processor 120 may receive the service information based on the current location of the electronic device 101 or a location of interest set by the user.

In operation 1405, the processor 120 may display service information on a map image via a display (e.g., the display device 160 of FIG. 1). The map image may be a beam area associated with the coverage area of the base station 401 of FIG. 4. The processor 120 may receive beam area information or beam book information corresponding to the current location of the electronic device 101 together with the service information. The processor 120 may store the received beam book information or the beam area information in a memory (e.g., the memory 130 of FIG. 1). For example, the processor 120 may display, based on the beam area information, the service information on the map image in the form of a beam area. The user may identify the service information displayed on the map image, and may identify which service is available on the current location or a location of interest or may move to a service location. Alternatively, the processor 120 may set a geofence area on the map image based on the user input. The processor 120 may transmit the set geofence area to the MEC server 501.

In operation 1407, the processor 120 may provide a service to the user. For example, the processor 120 may provide, to the user, a guidance associated with a method of receiving a service. The processor 120 may provide a guidance message indicating that an AR character is to be displayed if a camera application is executed. The guidance message may include at least one of text, an image, or a video. If the user executes a camera application according to the guidance message, the processor 120 may display the AR character on the display device 160.

In operations 1409 and 1411, the processor 120 may control beamforming, and may monitor deviation from a service area. Operations 1409 and 1411 may be performed in parallel while operation 1407 is performed. The processor 120 may execute a service when entering a geofence area, and may terminate the service when exiting from the geofence area. The processor 120 may monitor deviation from a service area, and may provide a guidance so that the user does not deviate from the service area. The processor 120 may display a message via the display device 160, and may report deviation from a service area via sound or vibration using a speaker (e.g., the sound output device 155 of FIG. 1) or a vibration module (e.g., the haptic module 179 of FIG. 1). According to various embodiments of the disclosure, the processor 120 may perform control so as to perform beamforming only for a beam associated with provision of a service. While receiving a service, a probability of deviation from the service area may be low. The processor 120 may limit a beamforming range based on beam book information received together with the service information, and may prevent (or limit) a signal delay by beamforming or power consumption of a battery (e.g., the battery 189 of FIG. 1).

Figure 15:
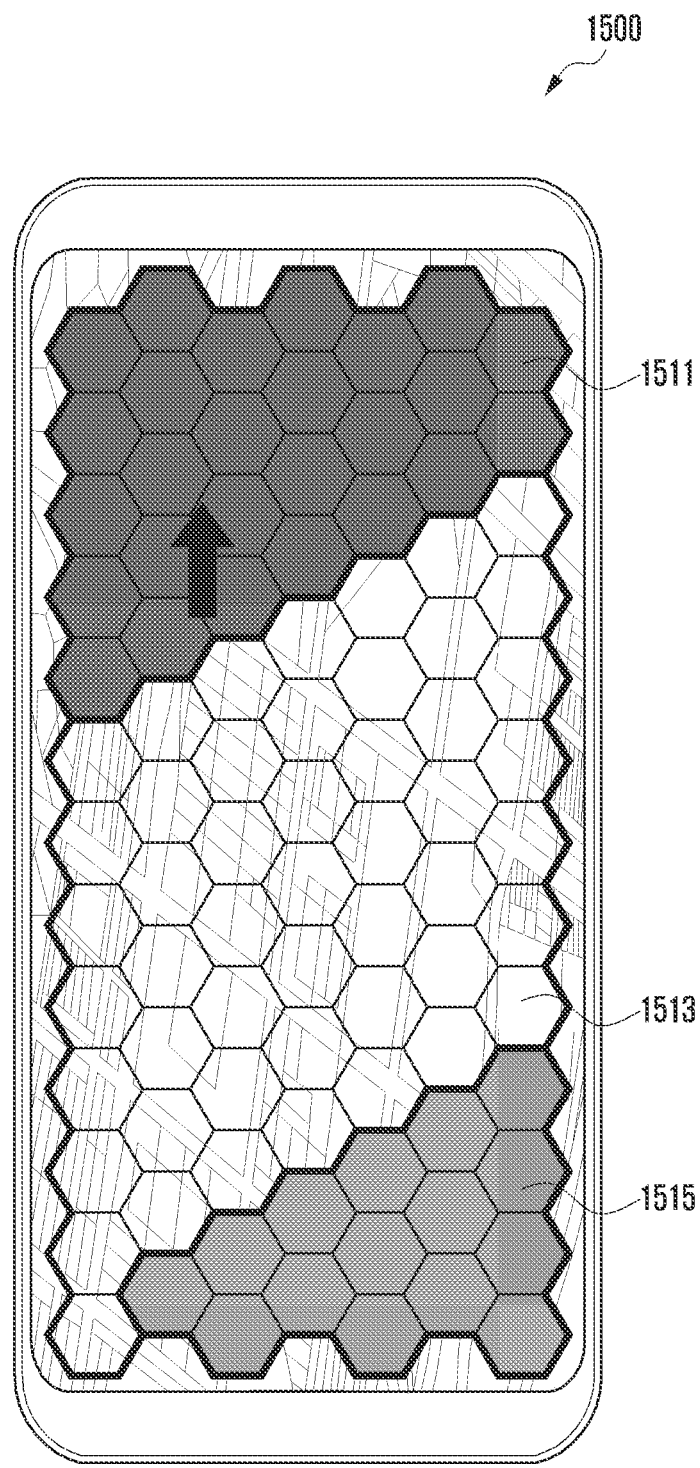
FIG. 15 is a diagram illustrating displaying service information on a map image by an electronic device according to an embodiment of the disclosure.

FIG. 15 is a diagram illustrating displaying service information on a map image by an electronic device according to an embodiment of the disclosure.

Referring to FIG. 15, a processor (e.g., the processor 120 of FIG. 1) of an electronic device (e.g., the electronic device 101 of FIG. 1) according to various embodiments may provide a map image 1500 including service information. The processor 120 may receive beam area information or beam book information from an MEC server (e.g., the MEC server 501 of FIG. 5), and may display, based on the beam area information or the beam book information, service information on the map image in the form of a beam area. A first area 1511 may be a first service area, a second area 1513 may be a second service area, and a third area 1515 may be a third service area. Alternatively, a user may identify a map image and may set a geofence area. For example, the processor 120 may set a first area 1511 as a first geofence area in the map image 1500 based on a user input, may set a second area 1513 as a second geofence area, and may set a third area 1515 as a third geofence area.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A base station comprising:
   an antenna module;
   an interface configured to perform delivery to a protocol for transmission;
   a memory; and
   a processor,
   wherein the processor is configured to:
      determine antenna information for each beam index based on a transmission beam producible by the antenna module,
      produce beam book information based on the determined antenna information,
      map the beam book information to a beam area,
      store the mapped beam book information in the memory, transmit the beam book information to an external server via the interface, perform beamforming based on the beam book information, identify an electronic device by receiving a reception beam from the electronic device in response to a transmission beam transmitted by the beamforming based on the beam book information, and transmit device connection information including information associated with the identified electronic device to the external server.

2. The base station of claim 1, wherein the processor is further configured to:

assign the beam index based on an angle or intensity of an antenna element included in the antenna module, and produce the beam book information including antenna information corresponding to the assigned beam index.

3. The base station of claim 1, wherein the device connection information is configured to include at least one of an identifier of the electronic device, beam information of the electronic device, beam movement information of the electronic device, radio resource information of the electronic device, a number of electronic devices in a beam area, or an order of entry of electronic devices in a beam area.

4. The base station of claim 1, wherein the processor is further configured to transmit the device connection information to the external server if at least one case is satisfied among a case in which a new electronic device enters a beam area associated with a coverage area of the base station, a case in which the electronic device leaves the beam area, and a case in which beam information of the electronic device is changed.

5. The base station of claim 1, wherein the processor is further configured to transmit the beam book information to the external server if a request for transmission of beam book information is received from the external server.

6. A server comprising:

a memory; and a processor, wherein the processor is configured to:

receive at least one piece of beam book information from a base station, map the beam book information to a beam geographical area, store the mapped beam book information in the memory, produce a service table based on the mapped beam book information, wherein the service table is produced by mapping an area-based service set by a service application to the beam book information, receive device connection information from the base station, and provide an area-based service to an electronic device based on the device connection information and the service table.

7. The server of claim 6, wherein the processor is further configured to receive a plurality of pieces of beam book information from a plurality of base stations connected to the server.

8. The server of claim 7, wherein the processor is further configured to assign a single piece of beam information included in the at least one piece of beam book information to a single beam area or to group a plurality of pieces of beam information included in the at least one piece of beam book information so as to assign the same to a single beam area.

9. The server of claim 8, wherein the processor is further configured to set the beam geographical area based on service information.

10. The server of claim 6, wherein the processor is further configured to:

request transmission of the beam book information from the base station, and receive the beam book information from the base station that provides a response to the request.

11. The server of claim 10, wherein the processor is further configured to transmit, to a content server, at least one of beam book information, a service table, or device connection information stored in the memory, in response to a request for information from the content server.

* * * * *